(12) United States Patent
Fulp et al.

(10) Patent No.: US 8,037,517 B2
(45) Date of Patent: Oct. 11, 2011

(54) METHOD, SYSTEMS, AND COMPUTER PROGRAM PRODUCTS FOR IMPLEMENTING FUNCTION-PARALLEL NETWORK FIREWALL

(75) Inventors: Errin W. Fulp, Winston-Salem, NC (US); Ryan J. Farley, Winston-Salem, NC (US)

(73) Assignee: Wake Forest University, Winston-Salem, NC (US)

( * ) Notice: Subject to any disclaimer, the term of this patent is extended or adjusted under 35 U.S.C. 154(b) by 1115 days.

(21) Appl. No.: 11/316,331

(22) Filed: Dec. 22, 2005

(65) Prior Publication Data

US 2006/0195896 A1  Aug. 31, 2006

Related U.S. Application Data

(60) Provisional application No. 60/638,436, filed on Dec. 22, 2004.

(51) Int. Cl.
*G06F 9/00* (2006.01)
*G06F 15/16* (2006.01)
*G06F 17/00* (2006.01)

(52) U.S. Cl. .............. 726/11; 726/22; 726/26; 713/153; 713/160; 713/168

(58) Field of Classification Search .............. 726/11
See application file for complete search history.

(56) References Cited

U.S. PATENT DOCUMENTS

| | | | |
|---|---|---|---|
| 6,484,261 B1 | 11/2002 | Wiegel | |
| 6,662,235 B1 | 12/2003 | Callis et al. | |
| 7,089,581 B1 | 8/2006 | Nagai et al. | |
| 7,107,613 B1 | 9/2006 | Chen et al. | |
| 7,227,842 B1 | 6/2007 | Ji et al. | |
| 7,237,267 B2 | 6/2007 | Rayes et al. | |
| 7,263,099 B1* | 8/2007 | Woo et al. ............ | 370/390 |
| 7,299,353 B2 | 11/2007 | Le Pennec et al. | |
| 7,331,061 B1 | 2/2008 | Ramsey et al. | |
| 2002/0038339 A1* | 3/2002 | Xu ................... | 709/203 |
| 2002/0165949 A1 | 11/2002 | Na et al. | |
| 2003/0120622 A1 | 6/2003 | Nurmela et al. | |

(Continued)

FOREIGN PATENT DOCUMENTS

WO  WO 2006/093557 A2  9/2006

OTHER PUBLICATIONS

Fulp "Firewall Architectures for High Speed Networks" U.S. Department of Energy Grant Application, Sep. 2003.*

(Continued)

*Primary Examiner* — Matthew B Smithers
*Assistant Examiner* — Shewaye Gelagay
(74) *Attorney, Agent, or Firm* — Jenkins, Wilson, Taylor & Hunt, P.A.

(57) ABSTRACT

Methods, systems, and computer program products for providing function-parallel firewalls are disclosed. According to one aspect, a function-parallel firewall includes a first firewall node for filtering received packets using a first portion of a rule set including a plurality of rules. The first portion includes less than all of the rules in the rule set. At least one second firewall node filters packets using a second portion of the rule set. The second portion includes at least one rule in the rule set that is not present in the first portion. The first and second portions together include all of the rules in the rule set.

46 Claims, 23 Drawing Sheets

U.S. PATENT DOCUMENTS

| | | | |
|---|---|---|---|
| 2004/0010712 | A1 | 1/2004 | Hui et al. |
| 2004/0177139 | A1 | 9/2004 | Schuba et al. |
| 2004/0193943 | A1 | 9/2004 | Angelino et al. |
| 2005/0125697 | A1 | 6/2005 | Tahara |
| 2005/0183140 | A1* | 8/2005 | Goddard ........................ 726/11 |
| 2005/0229246 | A1 | 10/2005 | Rajagopal et al. |
| 2005/0251570 | A1 | 11/2005 | Heasman et al. |
| 2006/0104202 | A1 | 5/2006 | Reiner |
| 2006/0248580 | A1 | 11/2006 | Fulp et al. |
| 2008/0301765 | A1 | 12/2008 | Nicol et al. |
| 2009/0138938 | A1 | 5/2009 | Harrison et al. |

OTHER PUBLICATIONS

Lee et al., "Development Framework for Firewall Processors", IEEE, 2002, pp. 352-355.*

Notification of Transmittal of the International Search Report and The Written Opinion of the International Searching Authority, or the Declaration for International Application No. PCT/US05/47008 (Sep. 11, 2006).

E. Fulp, "Optimization of Network Firewall Policies Using Ordered Sets and Directed Acyclical Graphs", Proceedings of IEEE Internet Management Conference, 2005.

E. Fulp et al., "Network Firewall Policy Tries", Technical Report, Computer Science Department, Wake Forest University, Jun. 2005.

E. Al-Shaer et al., "Modeling and Management of Firewall Policies", *IEEE Transactions on Network and Service Management*, 1(1): 2004.

E.W. Fulp, "Firewall Architectures for High Speed Networks", U.S. Department of Energy Grant Application Funded Sep. 2003.

E. Al-Shaer et al., "Firewall Policy Advisor for Anomaly Discovery and Rule Editing", *Proceedings of the IFIP/IEEE International Symposium on Integrated Network Management*, 2003.

V.P. Ranganath, "A Set-Based Approach to Packet Classification", *Proceedings of the IASTED International Conference on Parallel and Distributed Computing and Systems*, 889-894, 2003.

M. Christiansen et al., "Using IDDs for Packet Filtering", *Technical Report, BRICS*, Oct. 2002.

L.Qui et al., "Fast Firewall Implementations for Software and Hardware-Based Routers", *Proceedings of ACM Sigmetrics*, Jun. 2001.

D. Eppstein et al., "Internet Packet Filter Management and Rectangle Geometry", *Proceedings of the Symposium on Discrete Algorithms*, 827-835, 2001.

Notification of Transmittal of the International Search Report and the Written Opinion of the International Searching Authority, or the Declaration of International Application No. PCT/US06/11291 (Jul. 3, 2008).

Notification of Transmittal of the International Search Report and The Written Opinion of the International Searching Authority, or the Declaration for International Application No. PCT/US05/47008 (Sep. 11, 2006).

E. Fulp, "Optimization of Network Firewall Policies Using Ordered Sets and Directed Acyclical Graphs", Technical Report, Computer Science Department, Wake Forest University, Jan. 2004.

E. Fulp et al., "Network Firewall Policy Tries", Technical Report, Computer Science Department, Wake Forest University, 2004.

E. Al-Shaer et al., "Modeling and Management of Firewall Policies", *IEEE Transactions on Network and Service Management*, 1(1): 2004.

E.W. Fulp, "Firewall Architectures for High Speed Networks", U.S. Department of Energy Grant Application, Funded Sep. 2003.

E. Al-Shaer et al., "Firewall Policy Advisor for Anomaly Discovery and Rule Editing", *Proceedings of the IFIP/IEEE International Symposium on Integrated Network Management*, 2003.

V.P. Ranganath, "A Set-Based Approach to Packet Classification", *Proceedings of the IASTED International Conference on Parallel and Distributed Computing and Systems*, 889-894, 2003.

M. Christiansen et al., "Using IDDs for Packet Filtering", *Technical Report, BRICS*, Oct. 2002.

L.Qui et al., "Fast Firewall Implementations for Software and Hardware-Based Routers", *Proceedings of ACM Sigmetrics*, Jun. 2001.

D. Eppstein et al., "Internet Packet Filter Management and Rectangle Geometry", *Proceedings of the Symposium on Discrete Algorithms*, 827-835, 2001.

E. Fulp, "Preventing Denial of Service Attacks on Quality of Service", *Proceedings of the 2001 DARPA Information Survivability Conference and Exposition II*, 2001.

S. Goddard et al., "An Unavailability Analysis of Firewall Sandwich Configurations", *Proceedings of the $6^{th}$ IEEE Symposium on High Assurance Systems Engineering*, 2001.

G.V. Rooij, "Real Stateful TCP Packet Filtering in IP Filter", *Proceedings of the $10^{th}$ USENIX Security Symposium*, 2001.

P. Warkhede et al., "Fast Packet Classification for Two-Dimensional Conflict-Free Filters", *Proceedings of IEEE INFOCOM*, 1434-1443, 2001.

D. Decasper et al., "Router Plugins: A Software Architecture for Next-Generation Routers", *IEEE/ACM Transactions on Networking*, 8(1): Feb. 2000.

A. Feldmann et al., "Tradeoffs for Packet Classification", *Proceedings of the IEEE INFOCOM*, 397-413, 2000.

X. Gan et al., "LSMAC vs. LSNAT: Scalable Cluster-based Web servers"; *Journal of Networks, Software Tools, and Applications*, 3(3): 175-185, 2000.

A. Hari et al., "Detecting and Resolving Packet Filter Conflicts", *Proceedings of IEEE INFOCOM*, 1203-1212, 2000.

O. Paul et al., "A Full Bandwidth ATM Firewall", *Proceedings of the $6^{th}$ European Symposium on Research in Computer Security ESORICS'2000*, 2000.

J. Xu et al., "Design and Evaluation of a High-Performance ATM Firewall Switch and Its Applications" *IEEE Journal on Selected Areas in Communications*, 17(6): 1190-1200, Jun. 1999.

C. Benecke, "A Parallel Packet Screen for High Speed Networks", *Proceedings of the $15^{th}$ Annual Computer Security Applications Conference*, 1999.

R. Funke et al., "Performance Evaluation of Firewalls in Gigabit-Networks", *Proceedings of the Symposium on Performance Evaluation of Computer and Telecommunication Systems*, 1999.

S. Suri et al., "Packet Filtering in High Speed Networks", *Proceedings of the Symposium on Discrete Algorithms*, 969-970, 1999.

U. Ellermann et al., "Firewalls for ATM Networks", *Proceedings of INFOSEC'COM*, 1998.

V. Srinivasan et al., "Fast and Scalable Layer Four Switching", *Proceedings of ACM SIGCOMM*, 191-202, 1998.

M. Degermark et al., "Small Forwarding Tables for Fast Routing Lookups", *Proceedings of ACM SIGCOMM* 4-13, 1997.

S.M. Bellovin et al., "Network Firewalls", *IEEE Communications Magazine*, 50-57, 1994.

W.E. Leland et al.,"On the Self-Similar Nature of Ethernet Traffic", *IEEE Transactions on Networking*, 2(1); 15, 1994.

G. Brightwell et al., "Counting Linear Extensions is #P-Complete", *Proceedings of the Twenty-Third Annual ACM Symposium on Theory of Computing*, 1991.

M. Al-Suwaiyel et al., "Algorithms for Trie Compaction", *ACM Transactions on Database Systems*, 9(2): 243-263, Jun. 1984.

D. Comer, "Analysis of a Heuristic for Full Trie Minimization", *ACM Transactions on Database Systems*, 6(3): 513-537, Sep. 1981.

R.L. Graham et al., "Optimization and Approximation in Deterministic Sequencing and Scheduling: A Survey", *Annals of Discrete Mathematics*, 5: 287-326, 1979.

E.L. Lawler, "Sequencing Jobs to Minimize Total Weighted Completion Time Subject to Precedence Constraints", *Annals of Discrete Mathematics*, 2: 75-90, 1978.

J.K. Lenstra et al., "Complexity of Scheduling Under Precedence Constraints", *Operations Research*, 26(1): 22-35, 1978.

R. Rivest, "On Self-Organizing Sequential Search Heuristics", *Communications of the ACM*, 19(2): 1976.

W.E. Smith, "Various Optimizers for Single-Stage Production", *Naval Research Logistics Quarterly*, 3: 59-66, 1956.

Bellion, "High Performance Packet Classification", http://www.hipac.org (Publication Date Unknown).

Official Action for U.S. Appl. No. 11/390,976 (Jun. 24, 2009).

Communication pursuant to Rules 109 and 110 EPC for European application No. 05857614.1 (Aug. 31, 2007).

Official Action for U.S. Appl. No. 11/390,976 (Sep. 30, 2010).

Office Action for Australian application No. 2006230171 (Sep. 10, 2010).

Commonly-assigned, co-pending U.S. Appl. No. 12/871,806, filed Aug. 30, 2010).

Office Action for Australian application No. 2005328336 (Aug. 20, 2010).

Acharya et al., "Optwall: A Hierarchical Traffic-Aware Firewall," Department of Computer Science, Telecommunications Program, University of Pittsburgh, pp. 1-11 (2007).

Tarsa et al., "Balancing Trie-Based Policy Representations for Network Firewalls," Department of Computer Science, Wake Forest University, pp. 1-6 (2006).

Fulp, "Trie-Based Policy Representations for Network Firewalls," Proceedings of the IEEE International Symposium on Computer Communications (2005).

Interview Summary for U.S. Appl. No. 11/390,976 (Apr. 29, 2010).

Final Official Action for U.S. Appl. No. 11/390,976 (Mar. 26, 2010).

* cited by examiner

METHOD, SYSTEMS, AND COMPUTER PROGRAM PRODUCTS FOR IMPLEMENTING FUNCTION-PARALLEL NETWORK FIREWALL

RELATED APPLICATIONS

This application claims the benefit of U.S. Provisional Patent Application Ser. No. 60/638,436, filed Dec. 22, 2004; the disclosure of which is incorporated herein by reference in its entirety.

GOVERNMENT INTEREST

This invention was made with Government support under Grant No. DE-FG02-03ER25581 awarded by U.S. Department of Energy, Mathematical and Computational Information Sciences Division. The U.S. Government has certain rights in the invention.

TECHNICAL FIELD

The subject matter described herein relates to implementing network firewalls. More particularly, the subject matter described herein relates to methods, systems, and computer program products for implementing a function-parallel network firewall.

BACKGROUND ART

Firewalls remain the frontier defense for securing networks that are vital to private industry, government agencies, and the military. They enforce a security policy by inspecting and filtering traffic arriving at or departing from a secure network [3, 21, 22]. Meaningful inspections often involve a complex process, and if firewalls are to remain effective, they must adapt to constantly changing network demands, technology, and security threats.

As firewall technology evolves to meet new demands and threats, it must continue to act transparently to legitimate users, with little or no effect on the perceived network performance. The networks between two communicating machines should be invisible, especially if traffic requires specific network Quality of Service (QoS), such as bounds on the packet delay, jitter, and throughput. The firewall should process the legitimate traffic quickly, efficiently, and never violate the desired QoS. Unfortunately, the firewall can easily become a bottleneck, given increasing traffic loads and network speeds [12, 14, 18, 20, 21]. Packets must be inspected and compared against complex rule sets and tables, which is a time-consuming process. In addition, audit files must be updated with current connection information. As a result, current firewalls have difficulty maintaining QoS guarantees. Since a firewall can be overwhelmed with traffic, it is also susceptible to Denial of Service (DoS) attacks [21]. Such attacks merely overload/saturate the firewall with illegitimate traffic. Audit files and state tables quickly fill available storage space and legitimate traffic queued behind suspicious traffic encounters long delays. Legitimate users notice poor network performance, and, in the worst case, the secure network is disconnected from the outside world.

Inspecting traffic sent between networks, a firewall provides access control, auditing, and traffic control based on a security policy [3, 21, 22]. The security policy is a list of ordered rules, as seen in Table 1, that defines the action to perform on matching packets. A rule r can be viewed as a k-tuple $(r[1], r[2], r[3], \ldots, r[k])$, where $r[i]$ is specified as a variable length prefix.

TABLE 1

Example Security Policy Consisting of Multiple Ordered Rules

| No. | Proto. | Source IP | Source Port | Destination IP | Destination Port | Action |
|---|---|---|---|---|---|---|
| 1 | TCP | 140.* | * | * | 80 | accept |
| 2 | TCP | 150.* | * | 120 | 80 | accept |
| 3 | TCP | 140.* | * | 130 | 20 | accept |
| 4 | UDP | 150.* | * | * | 3030 | accept |
| 5 | * | * | * | * | * | deny |

In the examples described herein, rules will initially be represented as the 5-tuple (protocol, IP source address, source port number, IP destination address, destination port number). Fields can be fully specified or contain wildcards '*' in standard prefix format. For example the prefix 192.* would represent any IP address that has 192 as the first dotted-decimal number. In addition to the prefixes, each filter rule has an action, which is to accept or deny. An accept action passes the packet into or from the secure network, while deny causes the packet to be discarded. Rules are applied in order to every arriving packet until a match is found; otherwise, a default action is performed [21, 22].

Unfortunately, security policies may contain anomalies, such as a packet that matches multiple rules, where the matching rules specify conflicting actions. Security policy anomaly detection and correction is the subject of continued research [13, 21] and is not the focus of the present subject matter. Given the type of security policy required, rule sets can become quite large and complex. Security can be further enhanced with connection state and packet audit information. For example, a table can be used to record the state of each connection, which is useful for preventing certain types of attacks (e.g., TCP SYN flood) [21, 22].

Traditional firewall implementations consist of a single dedicated machine, similar to a router, that sequentially applies the rule set to each arriving packet. However, packet filtering represents a significantly higher processing load than routing decisions [15, 18, 22]. For example, a firewall that interconnects two 100 Mbps networks would have to process over 300,000 packets per second [21]. Successfully handling this high traffic becomes more difficult as rule sets become more complex [4, 14, 22]. Furthermore, firewalls must be capable of processing even more packets as interface speeds increase. In a high-speed environment (e.g. Gigabit Ethernet), a single firewall can easily become a bottleneck and is susceptible to DoS attacks [4, 7, 10, 12]. An attacker could simply inundate the firewall with traffic, delaying or preventing legitimate packets from being processed. Building a faster single firewall is possible [8, 15, 18, 19, 20]; however, the benefits are temporary (traffic loads and interface speeds are increasing); it is not scalable; it is a single point of failure; and it is generally not cost-effective for all installations.

A data-parallel firewall (or firewall sandwich) where each firewall node implements an entire firewall rule set is another approach to increase the speed of processing traffic [4, 12, 14, 22]. As shown in FIG. 1, the system consists of multiple identical firewalls 100 connected in parallel. Each machine implements the complete security policy and arriving packets are distributed across the machines for processing in parallel [4]. A packet distributor 102 implements a load balancing algorithm to distribute different packets to different firewall nodes. How the load-balancing algorithm distributes packets is vital to the system and is typically implemented as a high-speed switch in commercial products [11, 12]. Although data-parallel firewalls achieve higher throughput than traditional firewalls [4] and have a redundant design, they have difficulty maintaining QoS across networks. For example, legitimate traffic can encounter delays if it is queued behind traffic that requires more processing. Under these circumstances, users notice poor network performance, which is growing concern as more network applications require QoS assurances. Furthermore, stateful inspection requires all traffic from a certain connection or exchange to traverse the same parallel machine, which is difficult to perform at high speeds [14]. Therefore, new firewall architectures are needed to meet the demands of future networks and the challenges of increasing security threats.

SUMMARY

According to one aspect, the subject matter described herein includes a function-parallel firewall. The function-parallel firewall includes a first firewall node for filtering received packets using a portion of a rule set. The portion of the rule set may be less than all of the rules in the rule set. At least one second firewall node filters packets using at least one rule in the rule set that is not present in the portion implemented by the first firewall node. The first and second portions together include all of the rules in the rule set.

The term "firewall node," as used herein refers to a physical entity that implements one or more packet filtering rules. For example, a firewall node may be a single-processor computing device that implements the packet filtering rules. Alternatively, a firewall node may be a processor within a multi-processor computing device that implements one or more packet filtering rules. Thus, a multi-processor device may include multiple firewall nodes.

According to another aspect, the subject matter described herein includes a stateful function-parallel firewall system. The system includes a first function-parallel firewall subsystem including a plurality of firewall nodes implementing a first rule set for filtering packets arriving at a network. The first function-parallel firewall subsystem includes at least first and second firewall nodes respectively implementing first and second portions of the first rule set. The first portion includes at least one rule that is not present in the second portion. A second function-parallel firewall subsystem includes a second set of firewall nodes. The second set of firewall nodes implements a firewall rule set for filtering packets departing from the network. The second function-parallel firewall subsystem includes at least third and fourth firewall nodes. The third and fourth firewall nodes implement at least one rule that is not present in the second portion of the second rule set. The function-parallel firewall subsystems share state information regarding connections established through the first and second sets of firewall nodes.

According to another aspect, the subject matter described herein includes a firewall grid. The firewall grid includes a plurality of firewall nodes that are physically connected to each other via a network for filtering packets. A controller controls logical connections between the firewall nodes. The controller is adapted to configure the firewall nodes in a logical firewall hierarchy without changing physical connections between the firewall nodes.

According to yet another aspect, the subject matter described herein includes a method for distributing rules in a function-parallel firewall. The method includes defining a rule set for a function-parallel firewall. The method further includes assigning rules in the rule set to nodes and branches in a trie data structure. Each node in the trie data structure corresponds to a data field and each branch represents a value for each data field to be compared to be values in corresponding fields of received packets. The trie data structure is pruned in a manner that preserves ordering of the rules in the rule set.

According to yet another aspect, the subject matter described herein includes a method for assigning rules to a plurality of firewall nodes. The method includes assigning rules to nodes in a directed acyclical graph (DAG). Relationships between rules are represented by edges in the DAG. Rules are distributed among a plurality of firewall nodes using the DAG in a function-parallel manner and such that relationships between the rules specified in the DAG are preserved.

As used herein, the term "firewall" refers to a logical entity that is adapted to filter packets at the ingress and/or egress portions of a network based on a policy. The term "firewall" is intended to include systems that block packets from entering or leaving a network and systems that perform intrusion detection and intrusion protection functions for packets entering or leaving a network. Thus, the term "function-parallel firewall" is also intended to include an intrusion detection system or an intrusion protection system that operates in a function-parallel manner as described herein.

The subject matter described herein can be implemented using any combination of hardware, software, or firmware. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

One objective of the subject matter described herein is to provide a new security architecture, referred to herein as a hierarchical firewall, that provides the functionality of a traditional firewall (enforcing a security policy) and includes the following improvements:
1. Suitable for high speed networks and scalable for large traffic loads. Firewalls must continue to perform security tasks quickly and efficiently, appearing transparent to legitimate users under varying traffic loads.
2. Maintains QoS requirements and traffic differentiation. A growing number of network applications require QoS for their operation. Firewalls must not violate these guarantees while performing their security tasks.
3. Greatly lessens the impact of DoS attacks. Firewalls are candidates for DoS attacks, since they serve as the point of entry between two networks. New architectures must be capable of handling these new threats.
4. Highly available. Firewalls introduce a single point of failure between two networks. New firewall architectures must provide redundancy that prevents segmenting the secure network from the external network.

According to one aspect, the subject matter described herein includes a set of hierarchically configured computers that collectively enforce a desired security policy. Given this distributed configuration, traffic is quickly divided among the machines based on perceived threat. In one exemplary implementation, traffic that is considered safe may be promptly forwarded into the secure network, while the remaining traffic may be forwarded to different machines in the hierarchy for further scrutiny. Hence, traffic is segregated and queued based on security threat, yielding minimal delays for legitimate traffic. The system is also robust and highly available, since multiple machines are employed for the architecture and low cost, since Linux-installed PCs and open source software can be used for its implementation [21]. The proposed architecture is believed to be applicable to a wide variety of agencies in the public and private sectors.

The firewall architecture described herein will provide a scalable solution to varying traffic loads and QoS requirements, which are increasingly important as computing becomes more ubiquitous and applications become more diverse. The architecture is of interest to the networking community, since the architecture will result in new security policy models and optimization methods. The architecture is also relevant to the military and business community, since it provides a new, robust and cost-effective solution to security threats.

Some of the objects of the subject matter described herein having been stated hereinabove, and which are addressed in whole or in part by the subject matter described herein, other objects will become evident as the description proceeds when taken in connection with the accompanying drawings as best described hereinbelow.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 2:
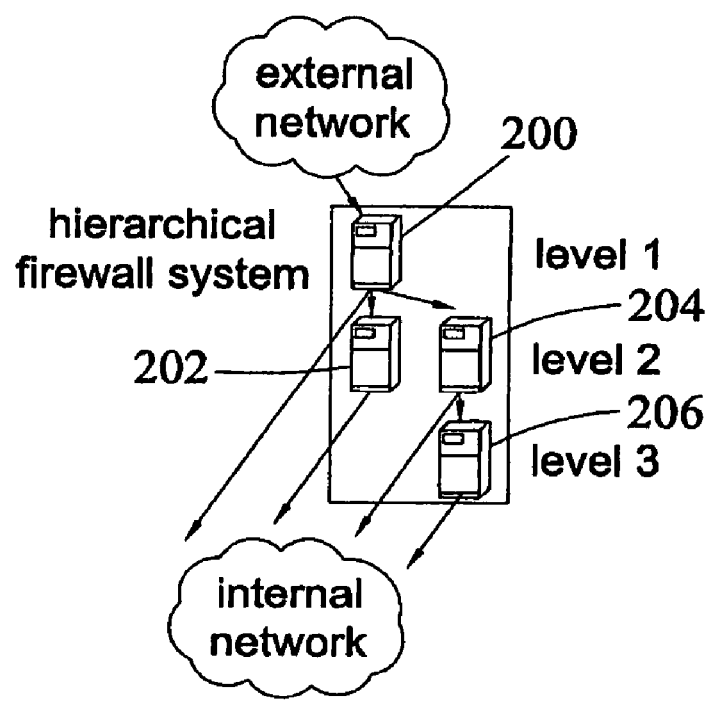
FIG. 2 is a block diagram illustrating an exemplary function-parallel firewall architecture according to an embodiment of the subject matter described herein.

According to one aspect of the subject matter described herein may include multiple firewall machines configured in a hierarchy, as shown in FIG. 2. In the example illustrated in FIG. 2, a plurality of firewall nodes 200, 202, 204, and 206 collectively implement a firewall policy. Each firewall node or set of nodes implements a different level of the firewall policy in a hierarchy. For example, firewall node 200 may implement a first level of a firewall policy that includes rules that are not present in subsequent levels. If a packet passes the first level of screening, the packet may be forwarded immediately to the internal network without impacting other firewall nodes. If the packet is identified as requiring further scrutiny, the packet may be forwarded to the next level where it is screened by firewall node 202 or 204 using rules that were not applied by firewall node 200. If the packet passes level 2 screening, the packet may be forwarded directly to the internal network. If the packet is indicated as requiring further screening, the packet will be passed to level 3 where level 3 screening is applied by firewall node 206.

At each level in the firewall hierarchy illustrated in FIG. 2, firewall nodes may implement different portions of a packet filtering rule set. An architecture in which different firewall nodes implement different portions of a firewall rule set is referred to herein as a function-parallel architecture. A function-parallel firewall architecture in which packet filtering rules are distributed among firewall nodes such that if a packet passes or fails at a certain level, the packet may bypass later levels is referred to herein as a hierarchical firewall architecture.

In the architecture illustrated in FIG. 2, at each level, machines may be configured to perform a specific security task quickly and efficiently. In one implementation, the firewall rules may be distributed across the different hierarchy levels such that increased scrutiny is placed at lower levels. Since the rules are distributed among the levels, no machine in the hierarchy is required to implement the entire rule set. In contrast, a data-parallel firewall architecture requires all machines to implement the complete rule set.

As described above, in the exemplary architecture illustrated in FIG. 2, packets start at the highest level and progress downward through the hierarchy. At each level, a packet can be forwarded to the internal network if deemed safe, forwarded to the next lower level for more processing, or dropped. The benefit of this divide-and-conquer approach is that traffic will incur delays consistent with its perceived security threat; therefore, traffic that is deemed safe will not be delayed by traffic that requires more processing. As a result, the hierarchical firewall can provide differentiated service and support QoS guarantees, unlike current designs. Furthermore, traffic that is forwarded to the internal network can be shaped at the particular firewall level, constraining the amount of traffic entering the network and lessening the effect of DoS attacks.

For example, in the hierarchical firewall depicted in FIG. 2, packets are forwarded from the external network to the first level, where initial security checks are performed, such as a quick validity check and comparisons of IP addresses. Packets with trusted IP addresses are immediately forwarded to the internal network, while the remaining packets are sent to the next level. At the second level, packets are separated based on transport protocols and/or port numbers. Again, if a packet is deemed safe it is immediately forwarded to the secure network; otherwise, they are sent to the next level for auditing. Log files may be used at one or more of the firewall nodes indicate which connections are open and have been requested. Each level may also drop packets based on perceived threat.

The preceding example illustrates a simple hierarchical firewall; however, the size and complexity can vary. In general, the hierarchy attempts to quickly divide traffic and provide differentiated service. More levels can be used for stronger security policies and to distribute traffic more efficiently. Determining the appropriate number of levels, the number of machines per level, and how to distribute the rule set are implementation details that may be used to optimize a function-parallel firewall according to an embodiment of the subject matter described herein.

Preliminary Experimental Results

Figure 1:
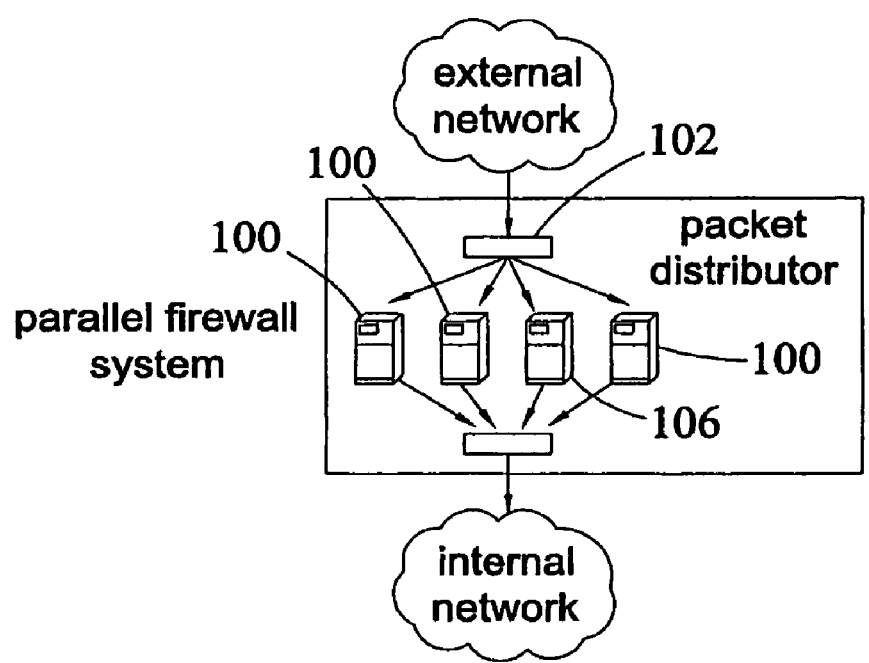
FIG. 1 is a block diagram of a conventional data-parallel firewall.

In this section, simulation is used to compare a hierarchical firewall with a traditional single-machine firewall and a data-parallel firewall [4, 22]. Each architecture implemented the same 325-rule security policy, where each rule required 1 unit of time to complete. The single firewall architecture consisted of one machine that processed each packet received from the external network. The data-parallel architecture consisted of four machines, as shown in FIG. 1, each implementing the same 325-rule set. The hierarchical firewall consisted of four machines configured in three levels, as shown in FIG. 2. Rules were distributed across the levels such that the first level implemented 25 rules; the second level implemented 50 rules each; and the third level implemented 75 rules. The group of rules performed at a certain machine will be referred to as a security task. The hierarchical firewall incurred an additional delay of one time unit when a packet was transmitted from machine to machine. Packets randomly arrived to the system using a Poisson distribution with a mean of 30 units and would randomly match one of the 325 rules based on a uniform distribution. For classification purposes, each packet was associated with the security task it matched (which group of rules). In this experiment, the performance parameters analyzed are the overall average packet delay, the maximum packet delay, and the average delay experienced by each packet type.

Figure 3A:
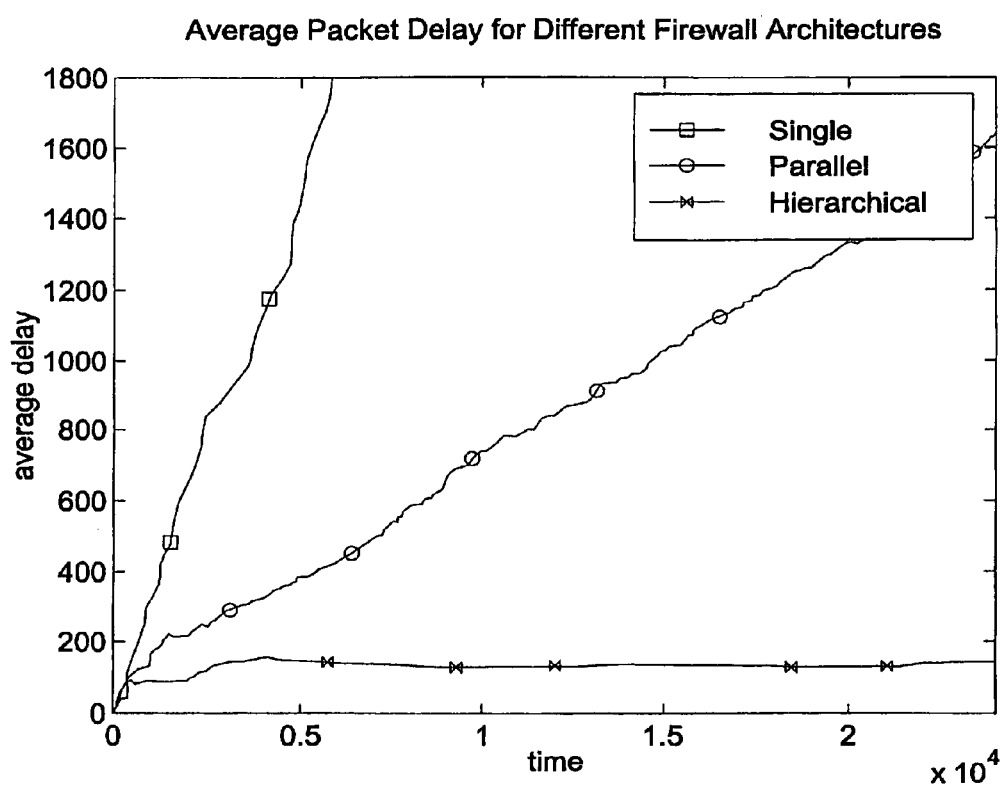
FIG. 3A is graph comparing simulation results for average packet delay for different firewall architectures.
Figure 3B:
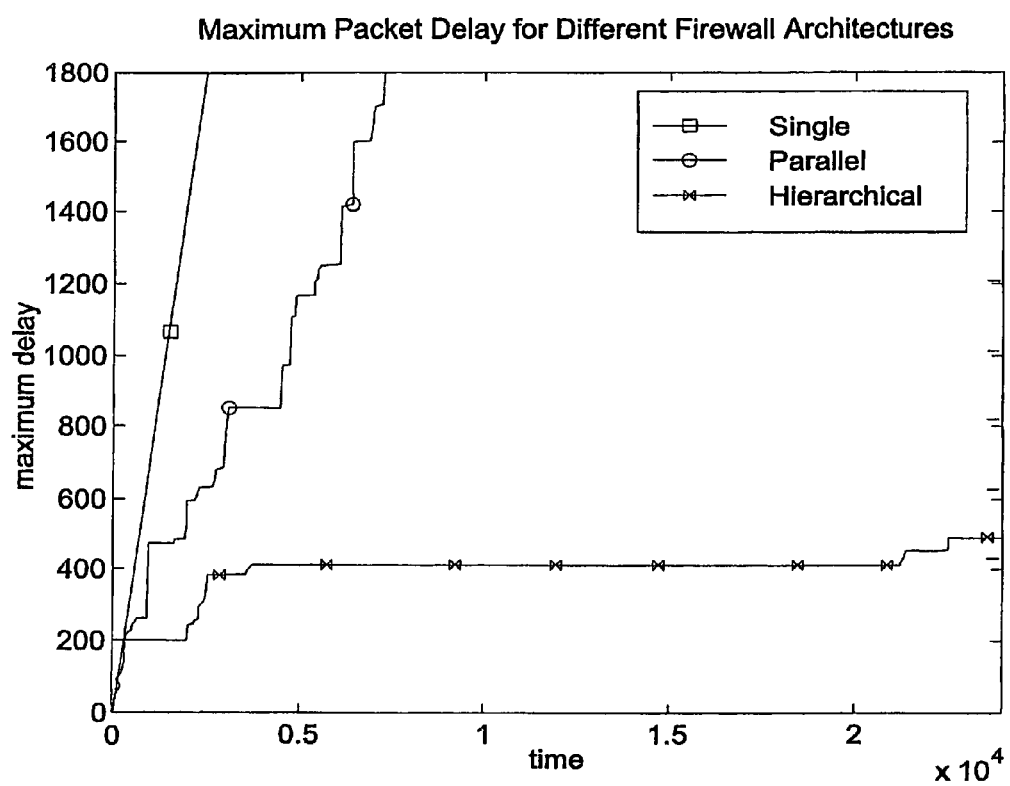
FIG. 3B is a graph comparing simulation results for maximum packet delay for different firewall architectures.
Figure 4A:
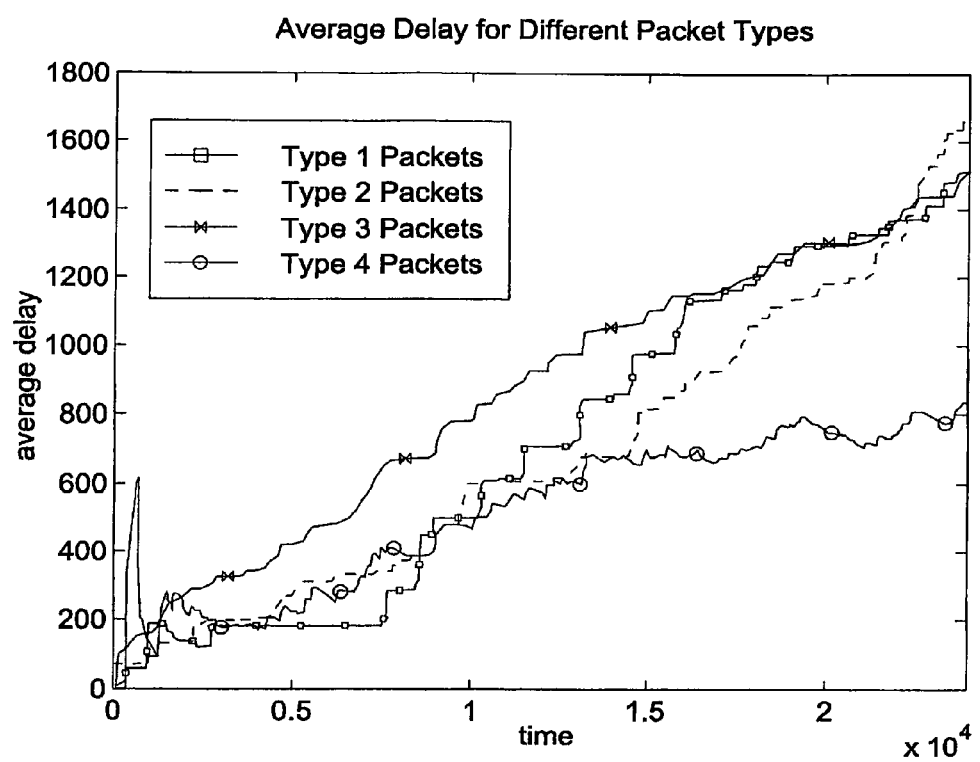
FIG. 4A is a graph illustrating average packet delay for different packet types for a data-parallel firewall.
Figure 4B:
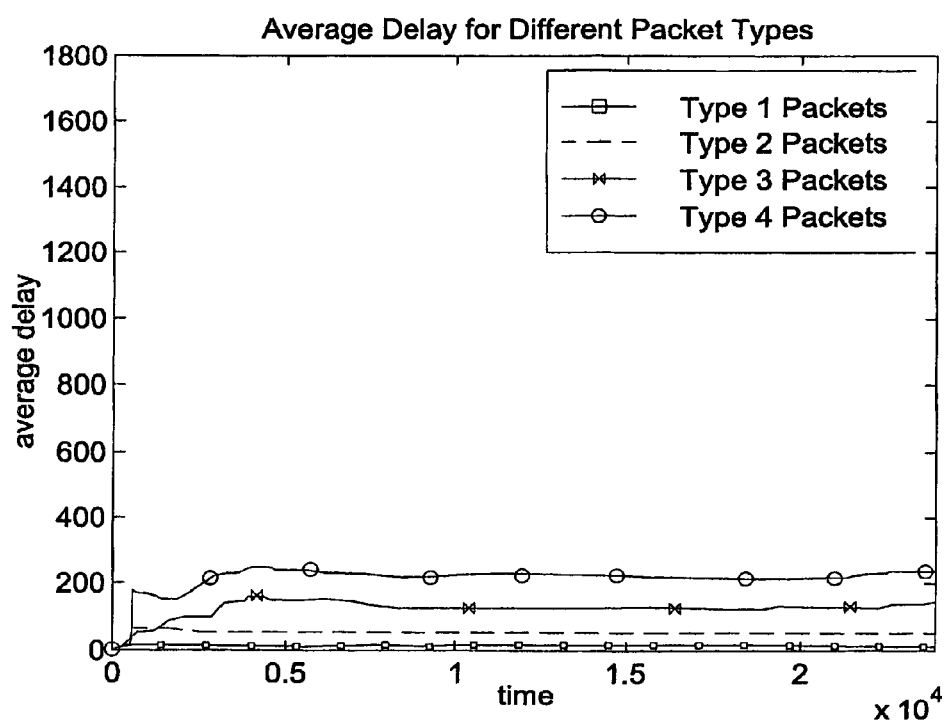
FIG. 4B is a graph illustrating simulation results for packet delay for different packet types for a function-parallel hierarchical firewall according to an embodiment of the subject matter described herein.

Experimental results for the different architectures are shown in FIGS. 3 and 4. More particularly, FIG. 3A illustrates average packet delay for a single firewall design, for the data-parallel firewall design illustrated in FIG. 1, and for the hierarchical firewall design illustrated in FIG. 2. FIG. 3B illustrates maximum packet delay for the single, data-parallel, and hierarchical firewall designs. FIG. 4A illustrates average packet delay for the data-parallel firewall design for different packet types. FIG. 4B illustrates average packet delay for the hierarchical firewall design for different packet types. Packet types refer to packets of a classified based on which security task was satisfied. Unlike the data-parallel firewall, the hierarchical design consistently yields different delays for each packet type.

For both delay measurements, the hierarchical architecture performed better than the single firewall and the data-parallel firewall. The single firewall had an average delay 31 times greater than the hierarchical architecture, which demonstrates how a single firewall machine can quickly become a bottleneck. Although the data-parallel firewall performed better than the single firewall, it had an average and maximum delay 6 times longer than the hierarchical architecture. In the parallel configuration, traffic that needed little processing often queued behind traffic that required more processing, which resulted in longer delays. In contrast, the hierarchical system consistently yielded better results, since traffic was distributed among the levels based on processing requirements.

The average delay experienced by each packet type is also important and is illustrated in FIGS. 4A and 4B. Delays in the hierarchical firewall were proportional to the amount of processing required; for example, security task 1 traffic had the shortest delay, security task 2 traffic had the second shortest delay, security task 3 traffic had the third shortest delay; and security task 4 traffic had the highest delay. Even though security tasks 2 and 3 were on the same level, security task 3 traffic had a delay slightly higher that security task 2 traffic, since it was queued with security task 4 traffic. Therefore, the hierarchical firewall is capable of providing differentiated service to multiple packet types/classes. In contrast, the delays varied for each packet type in the data-parallel firewall. Packets were constantly delayed by lower type/class traffic (e.g., security task 1 packets delayed by security task 4 packets); thus, no differentiation was achieved. Although these results are preliminary, they indicate the hierarchical architecture has merit, offering significantly better performance than current firewall systems.

Refinements

The previous section described an initial hierarchical firewall architecture for employing a security policy. Although preliminary results indicate the architecture has merit, refinements can be made so that the design can achieve its full potential. One refinement relates to the hierarchical architecture. Important questions include determining the appropriate number of levels and how to effectively distribute the security policy rules. Another refinement may include providing stateful packet inspection (maintaining connection tables) and increasing redundancy. Finally, another refinement may include examining other high-speed firewall architectures, such as a dynamic firewall grid. Analytical models and simulation will be used for design and analysis; in addition, a prototype will be implemented along with analysis tools and software.

Architecture Design and Rule Set Distribution

Important questions about the firewall architecture include the number of levels, the number of machines per level, and the number of security tasks per machine. The security policy is central for addressing these questions and, for this reason, will be formally defined and modeled. The model will be optimized to reduce the physical size, minimize the traversal time, and provide differentiated service. Afterward, the optimized policy model will be used to implement the actual hierarchical firewall.

Figure 5:
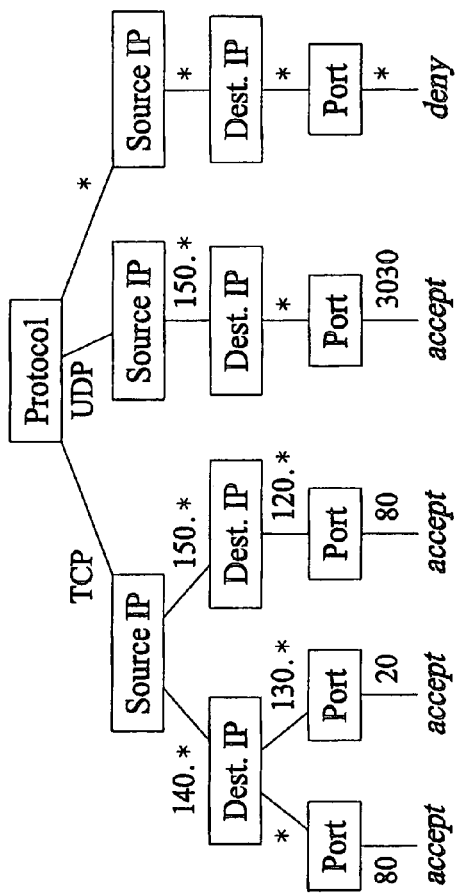
FIG. 5 is a data structure diagram illustrating a full trie representation of the security policy illustrated in Table 1.

One method for designing the hierarchy is to represent the security policy graphically as a tree data structure. This representation will aid the translation to the actual firewall, since it has a hierarchical form. Although a variety of tree data structures exist, a trie will be initially investigated [1]. A trie is a special type of data structure that has the advantages of fast retrievals and quick unsuccessful search determination, which are important for enforcing a security policy. In a security policy trie, each path from the root node to a leaf corresponds to one rule. The nodes of the trie correspond to the rule fields, while branches are possible values. FIG. 5 is a trie data structure for the rules in Table 1. For example, in FIG. 5, the root node is the protocol field. The next level represents the source IP address, while the leaf nodes represent the rule action. Rules that have the same field value at a node will share a branch for that value.

The trie in FIG. 5 referred to as full trie, since every non-cycle path from the root to a leaf has the same length, and every leaf lies at the same depth [6]. Unlike other policy models, the rule order must be preserved if the trie is to be successfully translated to a hierarchical firewall. The action to apply to a packet is determined by a preorder traversal. Starting at the root node, branches are compared to the fields of the packet. Since multiple branches may match a packet, they are traversed in order from left to right. If a packet field does not match any possible branches, it moves back to the previous node (parent), where the next branch is tested. Once the policy trie is developed, it can be translated into a hierarchical firewall. The nodes of the trie represent the machines in the hierarchy, while the branches represent the links between nodes. The value associated with each branch indicates the packet field value required to traverse it. Although a full trie representation of a security policy can be created, it is not necessarily optimal. Further trie manipulation is required create an effective hierarchical firewall, such as preventing routing to parents and limiting trie traversal time.

Pruning yields a trie that never requires routing to parent nodes, which provides faster packet processing [1, 15]. Assuming a full trie consists of n nodes and k levels (where k<=n), the worst case packet processing would be O(n*k) tuple-compares. In contrast, a pruned trie requires only O(k+n) tuple-compares in the worst case which is a processing reduction of 1/k. Pruning is accomplished by replacing general rules with descendants. Rule $r_1$ is a descendant of rule $r_2$, if $r_2[i]$ is a prefix of $r_1[i]$ for i=1, . . . , k. Therefore, pruning occurs by pushing a rule down to all its descendents, then deleting the rule. An example of a pruned version of the trie illustrated in FIG. 5 is given in FIG. 6, where [*, *, *, deny] is a general rule that can be pushed down to every other rule. Although the original branch has been removed and added to the other branches, the order is preserved, if branches are tested from left to right. Current pruning algorithms do not consider rule order, since tries were primarily developed for storing data [6]. New pruning techniques that preserve order may be developed and used to distribute rules among nodes in a functional-parallel firewall according to an embodiment of the subject matter described herein. Pruning may also cause the number of nodes in the hierarchy to increase, since a general rule is duplicated at different levels. For this reason, other techniques are needed to reduce the trie size.

Figure 6:
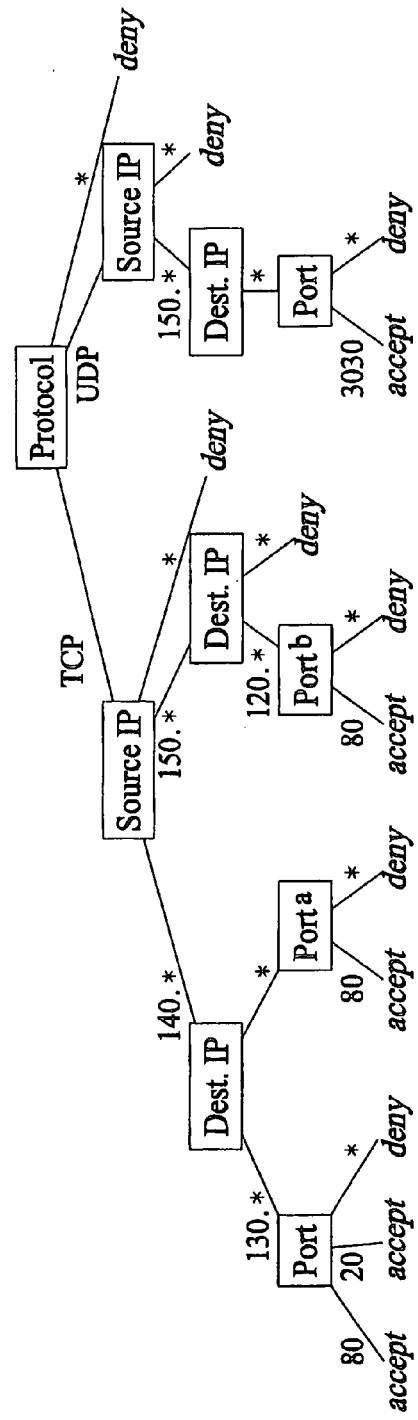
FIG. 6 is a data structure diagram illustrating a pruned trie representation of the security policy given in Table 1 where each packet is processed within four field comparisons.

Reducing the trie size is important, since delay increases each time a packet is forwarded from one node to another. The trie can be reduced by compressing nodes, which is achieved by removing single branching paths or consolidating sub-ties into one node [2, 6, 15]. As a result, a node may compare multiple rule fields or perform multiple security tasks per packet. For example, in FIG. 5, the rule [UDP, 150.*, *, 3030, accept] is considered a leaf chain [6] and can be compressed into one node (a single machine). Two other methods commonly used to reduce the size of a trie are Directed Acyclic Graphs (DAG) and level reordering [1, 6, 15]. If the same sub-trie appears in multiple places, then the trie structure can be changed to a DAG. The possible use of DAG is seen in FIG. 6, where nodes labeled $Port^a$ and $Port^b$ are equivalent sub-tries. Parent nodes of both sub-tries could point to just one, eliminating the need for the other.

Figure 7A:
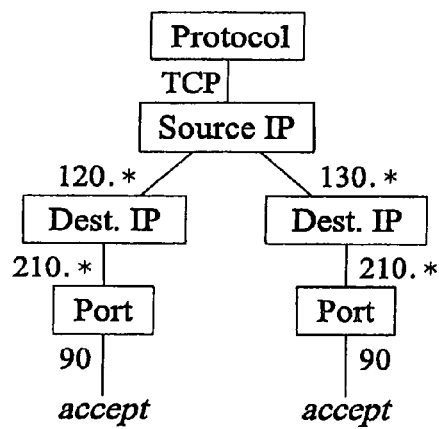
FIG. 7A is a data structure diagram illustrating a trie representing two security rules assuming that the default action per node is deny.
Figure 7B:
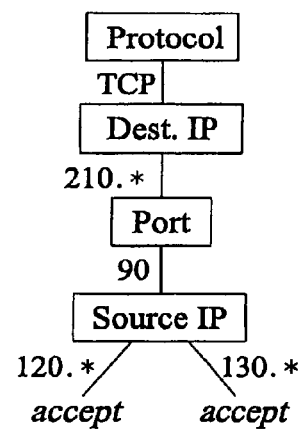
FIG. 7B is a data structure diagram illustrating a reordered version of the trie data structure illustrated in FIG. 7A.

Another method for reducing the trie size is level reordering. As seen in FIGS. 7A and 7B, the order of the levels can significantly affect the number of nodes in the trie. More particularly, in FIG. 7A, an original trie representing the security rule [TCP, 120.*, 210.*, 90, accept] and [TCP, 130.*, 210.*, 90, accept] is illustrated. Both FIGS. 7A and 7B assume that the default action per node is deny. Since some of the rules in the original trie in FIG. 7A include common elements, the rules can be reordered so that the number of branches in the subtrie are reduced. For example, in FIG. 7A, the destination IP address and port for each branch of the subtrie are the same. Accordingly, if these common portions of the rule are implemented at higher levels, the duplicate nodes in the trie can be reduced, as illustrated by FIG. 7B. More particularly, in FIG. 7B, the nodes for destination IP and port are placed before the node for source IP address. As can be seen from FIG. 7B, reordering the levels produces a smaller trie. Using a DAG can also reduce the number of nodes.

The problem of finding an ordering that guarantees a minimum size trie has been shown to be NP-complete; however, several heuristics have been developed [2, 6]. It should be noted that DAGs and reordering only reduce the number of nodes in the hierarchy and do not reduce the depth of the trie, which influences the traversal time.

Regardless of the applicability of these different trie modifications, they must be performed in concert to achieve an optimal hierarchical design. For example, the architecture utilizes multiple nodes to distribute traffic load and provide differentiated service; however, the trie path length (depth) impacts the packet traversal time. Therefore, compression and ordering must be performed together to provide differentiated service and optimize packet delay.

To achieve these goals, information not explicitly given in the security policy (e.g., QoS, level of trust, and processing time) may be used. For example, it is advantageous to place security tasks that require the most time at the lowest levels. This prevents packets from queueing behind traffic that requires more processing time; thus, lowering delay. A weight $w_i$ can be assigned to each security task $s_i$ (a single rule or multiple rules) based on the amount of time it requires. For example, an auditing security task requires more time (updating system files) than those that only perform field comparisons. Using these weights, the trie can be ordered to minimize the average traversal time. For example assuming i and j are hierarchy levels, where i<j, the trie can be ordered such that the average weight per level increases from the highest to the lowest level $\overline{w}_i < \overline{w}_j$, $\forall i \neq j$. In addition, the trie can be designed to separate traffic based on QoS or level of trust. Traffic would traverse different sub-tries, based on the type of service required, providing class isolation and different delays. The algorithms described in this section can then be applied to these sub-tries independently to reduce size and traversal time. These ideas were used to design the hierarchical firewall simulated in the preceding section, which showed excellent results. New algorithms for trie compression based on traversal time with constraints on QoS will be developed for optimizing function-parallel firewall design.

Packet traversal time remains a key performance metric for firewall systems. For this reason, queueing models will be used to analyze the delay of different firewall designs. The node delay encountered by a packet consists of the processing time, queueing delay, and transmission time. The processing delay is the time required to perform the security task. Assume node i must process $R_i$ rules per packet and can perform xi rules per unit time, then the service rate is $x_i/R_i$ packets per unit time. Queueing is the delay associated with waiting for processing and depends on the system state. The transmission delay is the time required to transmit the packet, which depends on the packet's length and the line speed. The maximum delay experienced by a packet traversing the firewall is the sum of the node delays along the path from the root to a leaf.

Figure 8A:
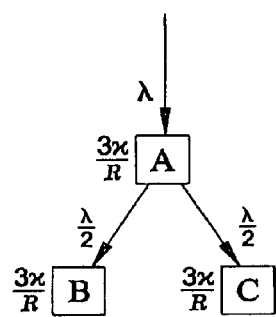
FIG. 8A is a diagram illustrating a Jackson model for a function-parallel hierarchical firewall according to an embodiment of the subject matter described herein.
Figure 8B:
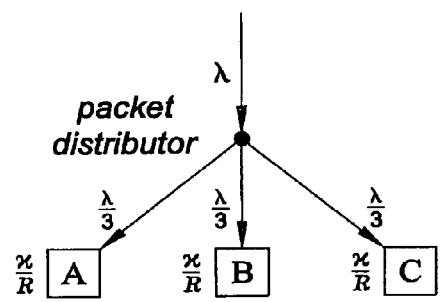
FIG. 8B is a diagram illustrating a Jackson model for a data-parallel firewall.

If it is assumed the packet arrival and processing (transmission and security task) rates are exponentially distributed, the node can be modeled as an M/M/1 queue [5, 17]. The firewall can then be considered an open network of M/M/1 queues, where probabilities are assigned to each link to indicate the likelihood of moving to the next node. This is a Jackson network model, which has a product-form solution for the average delay [5, 17]. The average end-to-end delay for N cascading nodes (traversal path) can be computed as $$E(T) = \sum_{i=1}^{N} \frac{1}{\mu_i - \lambda_i} \quad (1)$$

where $1/\mu_i$ is the service time (processing and transmission) and $\lambda_i$ is the arrival rate to node i. FIGS. 8A and 8B respectively illustrate Jackson models for hierarchical and data-parallel firewalls. In FIGS. 8A and 8B, it is assumed that the total arrival rate to each system is λ packets per unit time, each system implements the same R rule security policy, and each node can perform x rules per unit time. For the hierarchical firewall, shown in FIG. 8A, the policy rules are evenly distributed to each node; therefore, the service rate is 3x/R per node. The traffic arrival rate to node A is λ packets per unit time, half of the packets are forwarded to node B, while the other half is forwarded to node C. Although not considered in this example, some traffic may be forwarded into the secure network or dropped by node A; therefore in this case, the sum of the rates to nodes B and C would be less than λ. Using these values, the average end-to-end delay for either path in the hierarchical firewall is $$E_h(T) = \frac{1}{\frac{3x}{R} - \lambda} + \frac{1}{\frac{3x}{R} - \frac{\lambda}{2}} \quad (2)$$

For the data-parallel configuration, illustrated in FIG. 8B, traffic arrives at the packet distributor, which evenly distributes the traffic to each node. Each node implements the complete rule set R; therefore, the service rate is x/R. The end-to-end delay across any node in the data-parallel firewall is $$E_p(T) = \frac{1}{\frac{x}{R} - \frac{\lambda}{3}} \quad (3)$$

Figure 9:
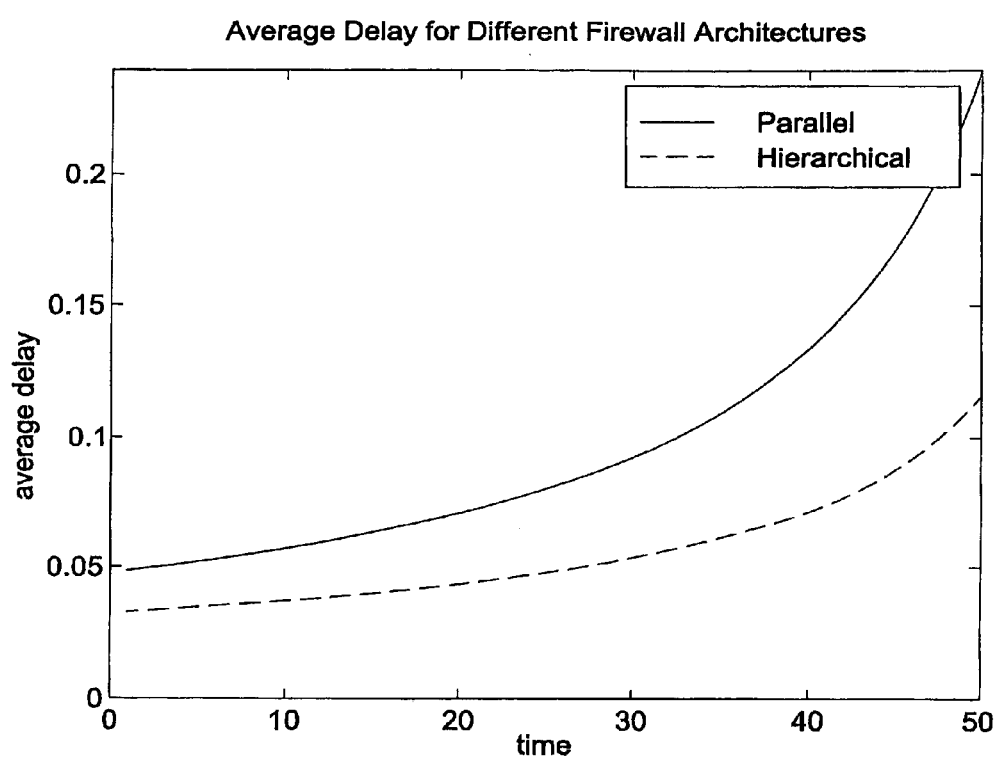
FIG. 9 is a graph illustrating simulation results for average delay for different firewall architectures.

Using these models, the effect of increasing traffic load λ on the average end-to-end delay for the two architectures is shown in FIG. 9. For this example, the arrival rate λ ranged from 1 to 50 packets per unit time. The rule set R consisted of 240 rules, while x equaled 5000 rules per unit time. Each of the hierarchical nodes incurred an additional delay of five time units to compensate for inter-node transmission. As expected, the average delay increases as the network load increases for both architectures; however, the average delay is consistently lower for the hierarchical firewall. This is due to the decreased rule set per node and the reduced arrival rates for nodes B and C. The average is an upper bound for the hierarchical firewall. Allowing node A to forward packets to the secure network or to drop packets would reduce the load on the second level and decrease delays. The arrival rate is less per node in the data-parallel firewall; however, the system has a higher end-to-end delay because each node must implement the complete rule set. The theoretical results are consistent with the experimental results described above. These models provide an important tool for analyzing the effect of load and rule distribution on end-to-end delay. In addition to analytical results, simulation will be used to measure the performance of the hierarchical designs under various conditions.

Stateful Firewalls

Another aspect of the subject matter described herein includes a stateful hierarchical firewall. The preceding design is considered stateless, or static, since the security action taken is based solely on the packet currently inspected. A stateful firewall provides better security by tracking and controlling network flows (packets belonging to a particular network connection or exchange) [16, 21, 22]. In one exemplary implementation, a stateful firewall can be achieved by storing state information concerning each flow in a table, and then according it with the security policy. For example, each time a TCP connection is established from the internal network to the external network, it is logged in a table. The table may contain the source and destination addresses, port numbers, sequencing information, and connection flags. Afterwards, packets arriving from the external network claiming to be part of an existing TCP connection can be checked against the table. If a packet belongs to an existing connection or exchange, it can be accepted. Otherwise, it is dropped. Table entries expire, if packets belonging to an exchange are not observed by the firewall over a period of time [21].

Figure 10:
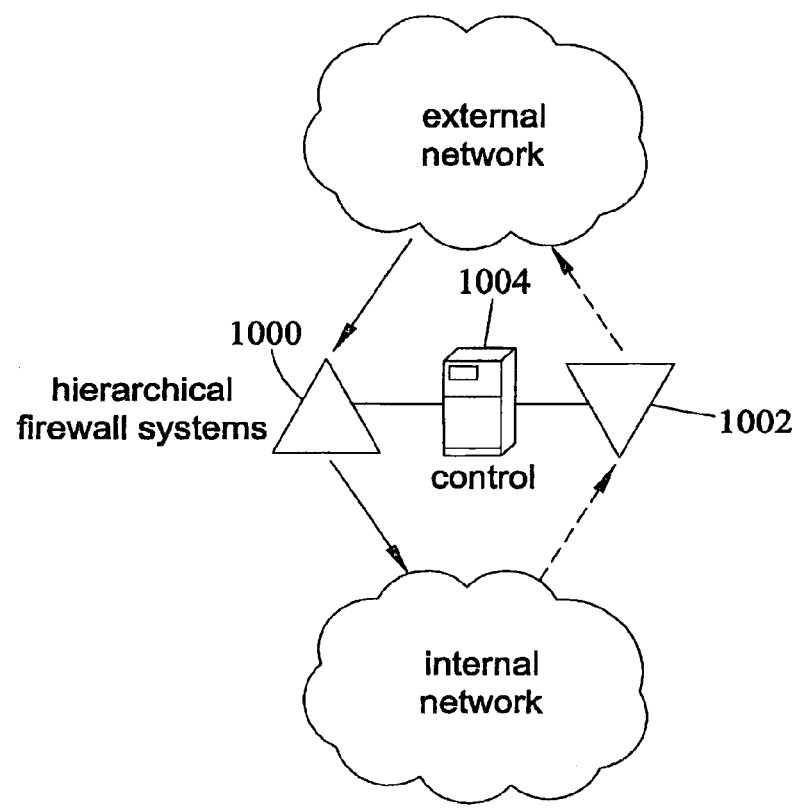
FIG. 10 is a block diagram illustrating a stateful hierarchical firewall according to an embodiment of the subject matter described herein.

Therefore, a stateful firewall is dynamic and limits the hackers' opportunity to exploit certain services. The increased security does require additional memory and time for table manipulation, which is problematic for high-speed networks. Furthermore, the firewall must process all traffic arriving and departing the secure network to adequately maintain the connection tables 21]. To solve these problems, the proposed firewall system will be divided into two hierarchies, one for arriving traffic and another for departing traffic, as illustrated in FIG. 10. In FIG. 10, a stateful firewall system includes first and second hierarchical firewall subsystems 1000 and 1002 and a control node 1004. First and second hierarchical firewall subsystems 1000 and 1002 may be function-parallel firewall systems including a plurality of firewall nodes with different rules distributed among different nodes as described above. In one exemplary implementation, hierarchical firewall subsystem 1000 may include at least two firewall nodes that implement different portions of a first firewall rule set. Similarly, hierarchical firewall subsystem 1002 may include at least two firewall nodes that implement different portions of a second firewall rule set. Firewall subsystem 1000 may filter packets entering the network. Firewall subsystem 1002 may filter packets departing from the network. Firewall subsystems 1000 and 1002 may share state information regarding connections established through the nodes within each system. Control node 1004 may store the state information and may be accessible by the nodes in hierarchical firewall subsystems 1000 and 1002. Rules can be distributed to the hierarchies and the designs can be optimized using the methods described in preceding section.

However, a new problem with the stateful model is the need to distribute state information across nodes. For example, nodes that scrutinize arriving traffic must be aware of any new connections permitted by nodes that inspect departing traffic. Furthermore, nodes must be informed of table entries that expire over time. To communicate state information, a central database machine, such as control node 1004, may collect and distribute the information (table entries) to the appropriate nodes. In one exemplary implementation, control node 1004 may not perform table queries on behalf of nodes. Individual nodes will only query their local tables, which prevents the central machine from becoming a bottleneck. In addition, the central machine will only send information (table entries) to nodes that might require it. As a result of this policy, the table searched by an individual node is reduced (contains only relevant information) as well as the search time. In an alternate implementation, control node 1004 may store the connection table and may perform queries for packets received by firewall subsystems 1000 and 1002.

Survivability and Firewall Grids

Another aspect of the subject matter described herein focuses on increasing the survivability of the hierarchical design. Although the proposed design has the benefit of increased packet throughput and minimal delay, the reliability of the system is decreased, since more machines (nodes) are deployed. For example, if the highest level node fails (is unable to inspect more traffic or goes off-line), then the entire hierarchy is unable to process packets. For this reason, the hierarchy is considered an n of n system, where all n machines must be functioning for the system to operate correctly [4, 12].

Survivability of the system can be improved with the use of redundant (parallel) nodes at different levels. For example, the first level may include multiple machines in parallel, where each machine implements the same security task (e.g., an IP check). An arriving packet would be sent to only one of the parallel machines, where it would be accepted, dropped, or forwarded to the next level for further processing. If one of the parallel nodes fails, then the remaining nodes can process the traffic. An additional benefit of parallel processing is the equal distribution of traffic among nodes, which can result in higher throughput and lower delays. Details such as where to locate parallel nodes and the number of machines required for each parallel configuration may depend on the desired degree of reliability versus cost of deploying redundant machines.

Yet another aspect of the subject matter described herein includes a grid of configurable firewalls (nodes) that can be used to efficiently process traffic, while being highly available. In one exemplary implementation, the grid may include a network of highly interconnected nodes (possibly via a high-speed switch or router) that can be logically deployed in various configurations (e.g., parallel, hierarchical, or hybrid). The advantage of the firewall grid is its ability to quickly adapt to new demands. When security needs change (e.g., due to policy changes, increased traffic volume, or node failure), these machines can be deployed or configured to maintain throughput and QoS requirements. For example, in a logical hierarchy, if a higher level encounters an increased traffic load, less frequently used redundant machines at lower levels can be reconfigured to process packets at the higher level. Unlike the hierarchical model, physical changes are not required, since all the machines are interconnected. Only the logical connection between nodes must be updated, which can be performed quickly. Like the stateful hierarchical firewall, the initial grid model will use a central machine to coordinate node configuration and communication. This central machine will play an important role in the system (balancing processing demand per node) and may constrain the efficiency of the firewall grid. Future versions of the firewall grid will attempt to place more intelligence in the nodes and allow them to interact independently and adapt dynamically under the guidance of a general security policy.

Figure 11A:
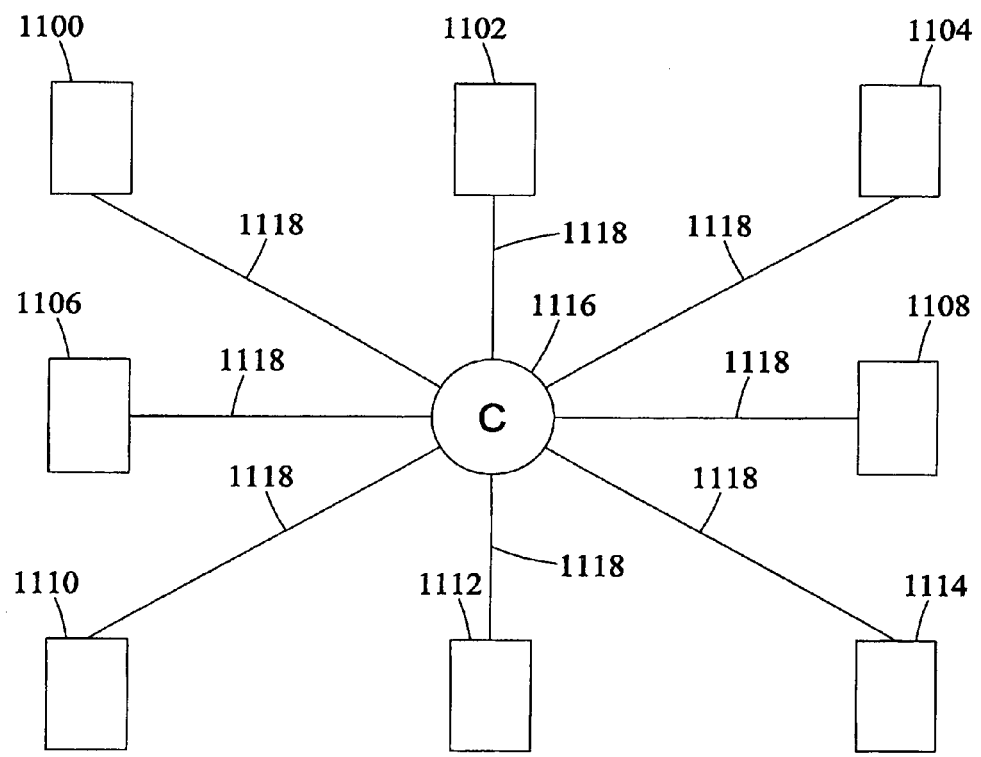
FIG. 11A is a block diagram illustrating physical connections of a firewall grid according to an embodiment of the subject matter described herein.
Figure 11B:
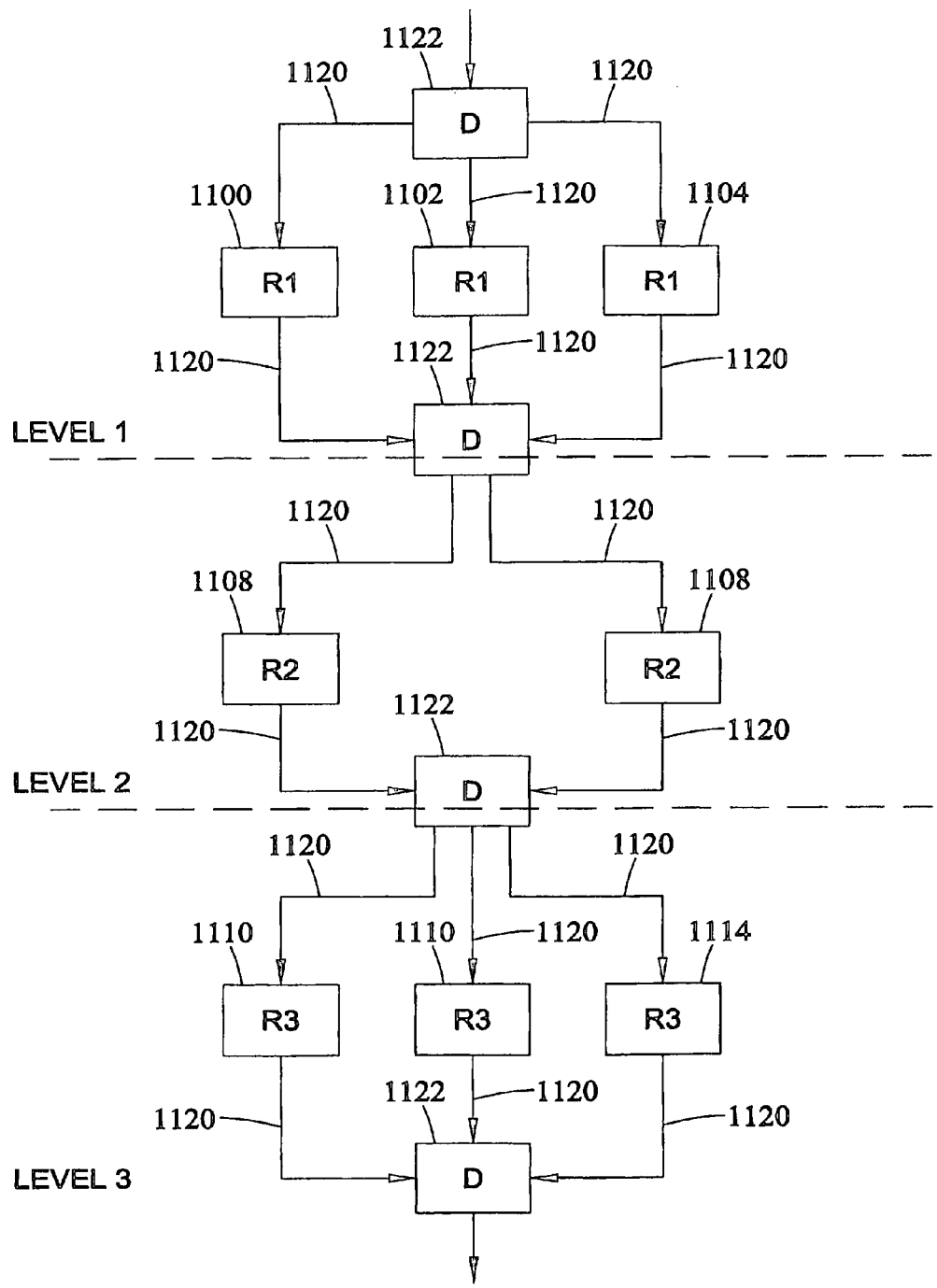
FIG. 11B is a block diagram illustrating logical connections of the firewall grid illustrated in FIG. 11A according to an embodiment of the subject matter described herein.

FIGS. 11A and 11B illustrate an example of a firewall grid according to an embodiment of the subject matter described herein. Referring to FIG. 11A, a plurality of firewall nodes 1100-1114 are connected via a control node 1116. Each firewall node 1100-1114 may be configured to implement different portions of a firewall rule set, as controlled by control node 1116. Each of the firewall nodes is physically connected to the other firewall nodes via physical connections 1118. Physical connections 1118 may be local area network connections, such as Ethernet connections. As such, control node 1116 may be an Ethernet switch.

In FIG. 11B, firewall nodes 1100-1114 are connected via logical connections 1120. Logical connections 1120 may be implemented by control node 1116 without changing physical connections 1118. For example, control node 1116 may configure the output port to which firewall 1106 is connected to receive frames from firewalls 1100, 1102, and 1104. Similar internal configurations can be implemented for the remaining firewalls illustrated in FIG. 11B. In FIG. 11B, logical connections 1120 between the firewalls implement a hierarchical, function-parallel firewall design, such as that illustrated in FIG. 1. In addition, the design illustrated in FIG. 11B is also data-parallel at each level. For example, each firewall node at each level may implement a common rule or rule set. For example, the rule set implemented by the firewall nodes in level 1 is illustrated in FIG. 11B as R1. The firewall nodes in level 2 implement a rule set represented by R2, and the firewall nodes in level 3 implement a rule set represented by R3. If any of the firewall nodes in a given level fails, the remaining firewall nodes in that level may take over operation for the failed firewall. Alternatively, as described above, if a failure or a bottleneck occurs at one level, a less-used firewall at another level may be logically configured to operate at the level where the failure or congestion occurred. Packet distributors 1122 may be configured to distribute the firewall rules between the firewalls at each level. Thus, as illustrated by FIGS. 11A and 11B, logical connections between firewall nodes and a firewall grid may be dynamically altered (i.e., changed on the fly without ceasing packet filtering operation) by a controller node without changing the physical connections between the firewalls.

Firewall Implementation

In addition to the analytical models and simulations described above, an implementation of a hierarchical firewall to measure performance will now be described. One exemplary implementation may utilize Linux-based PCs and Ethernet connections. Each PC will contain multiple Ethernet cards and be loaded with the Linux 2.4 kernel. The 2.4 kernel has support for various packet queueing disciplines, traffic control methods, and packet processing (e.g., iproute2, tc, and iptable). Collectively, these functions are required for advanced packet filtering. For example, iproute2 and iptable can route packets based on information other than the destination address, while tc can mark and shape traffic. PCs will serve as hierarchical nodes, sources and receivers of network traffic, and hierarchy controllers.

Results from an initial implementation of a three-node hierarchical firewall indicate that these open-source components are suitable for high-speed networks. The Computer Science Department at Wake Forest University has 10 PCs available for this project, where each has a 600 Mhz processor and multiple 100 Mbps Ethernet cards. These machines will serve as an initial testbed for system development; however, faster machines and high-speed network connections are required for actual system testing. For this reason, this project requests the purchase of 6 additional PCs (2.4 Ghz processors), each with multiple Gigabit Ethernet cards (3 cards per machine). These new machines will be configured as the firewall, while the current machines will serve as traffic generators and receivers. For comparison purposes, parallel and single-machine firewalls will also be implemented using this equipment. Any software required will be developed and provided by the Computer Science Department.

Firewall Rule Distribution for Function-Parallel Firewall Design

As stated above, one aspect with creating an optimal function-parallel firewall design includes distributing rules among firewalls in the firewall rule set. Firewall rules are preferably distributed among firewall nodes in a manner that preserves firewall policy integrity. The following sections describe an exemplary firewall rule set and different options for distributing the firewall rule set among firewall nodes in a function-parallel firewall design.

Firewall Policy

In this section and the following sections, a rule r is modeled as an ordered tuple of sets, $r=(r[1], r[2], \ldots, r[k])$. Order is necessary among the tuples since comparing rules and packets requires the comparison of corresponding tuples. Each tuple $r[l]$ is a set that can be fully specified, specify a range, or contain wildcards '*' in standard prefix format. For the Internet, security rules are commonly represented as a 5-tuple consisting of: protocol type, IP source address, source port number, IP destination address, and destination port number [21, 22]. For example, the prefix 192.* would represent any IP address that has 192 as the first dotted-decimal number. Given this model, the ordered tuples can be supersets and subsets of each other, which forms the basis of precedence relationships. In addition to the prefixes, each filter rule has an action, which is to accept or deny. However, the action will not be considered when comparing packets and rules. Similar to a rule, a packet (IP datagram) d can be viewed as an ordered k-tuple $d=(d[1], d[2], \ldots, d[k])$; however, ranges and wildcards are not possible for any packet tuple.

Using the previous rule definition, a standard security policy can be modeled as an ordered set (list) of n rules, denoted as $R=\{r_1, r_2, \ldots, r_n\}$. A packet d is sequentially compared against each rule $r_i$ starting with the first, until a match is found ($d \Rightarrow r_i$) then the associated action is performed. A match is found between a packet and rule when every tuple of the packet is a subset of the corresponding tuple in the rule.

Definition Packet d matches $r_i$ if $$d \Rightarrow r_i \text{ iff } d[l] \subseteq r_i[l], l=1, \ldots, k$$

The rule list R is comprehensive if for every possible legal packet d a match is found using R. Furthermore, two rule lists R and R' are equivalent if for every possible legal packet d the same action is performed by the two rule lists. If R and R' are different (e.g. a reorder) and the lists are equivalent, then the policy integrity is maintained.

As described above, a rule list has an implied precedence relationship where certain rules must appear before others if the integrity of the policy is to be maintained. Table 2 shown below illustrates an exemplary rule set that will be used herein to illustrate precedence relationships and rule assignment according to an embodiment of the subject matter described herein.

TABLE 2

Example Security Policy Consisting of Multiple Ordered Rules

| No. | Proto. | Source IP | Source Port | Destination IP | Destination Port | Action | Prob. |
|---|---|---|---|---|---|---|---|
| 1 | UDP | 1.1.* | * | * | 80 | deny | 0.01 |
| 2 | TCP | 1 | * | 1.* | 90 | accept | 0.02 |
| 3 | TCP | 2.* | * | 2.* | 20 | accept | 0.25 |
| 4 | UDP | 1.* | * | * | * | accept | 0.22 |
| 5 | * | * | * | * | * | deny | 0.50 |

In Table 2, rule $r_1$ must appear before rule $r_4$, likewise rule $r_5$ must be the last rule in the policy. If for example, rule $r_4$ was moved to the beginning of the policy, then it will shadow [23] the original rule $r_1$. Shadowing is an anomaly that occurs when a rule $r_j$ matches a preceding rule $r_i$, where i<j. As a result of the relative order $r_j$ will never be utilized. However, there is no precedence relationship between rules $r_1$, $r_2$, or $r_3$ given in Table 2. Therefore, the relative order of these three rules will not impact the policy integrity and can be changed to improve firewall performance.

As described in [28], the precedence relationship between rules in a policy can be modeled as a Policy Directed Acyclical Graph (DAG). Let G=(R,E) be a policy DAG for a rule list R, where vertices are rules and edges E are the precedence relationships (constraint). A precedence relationship, or edge, exists between rules $r_i$ and $r_j$, if i<j and the rules intersect [28]. Definition The intersection of rule $r_i$ and $r_j$, denoted as $r_i \cap r_j$ is $$r_i \cap r_j = (r_i[l] \cap r_j[l]), l=1, \ldots, k$$

Therefore, the intersection of two rules results in an ordered set of tuples that collectively describes the packets that match both rules. The rules $r_i$ and $r_j$ intersect if every tuple of the resulting operation is non-empty. In contrast, the rules $r_i$ and $r_j$ do not intersect, denoted as $r_i \cap r_j$, if at least one tuple is the empty set. It should be noted that the intersection operation is symmetric; therefore, if $r_i$ intersects $r_j$, then $r_j$ will intersect $r_i$. The same is true for rules that do not intersect.

Figure 12:
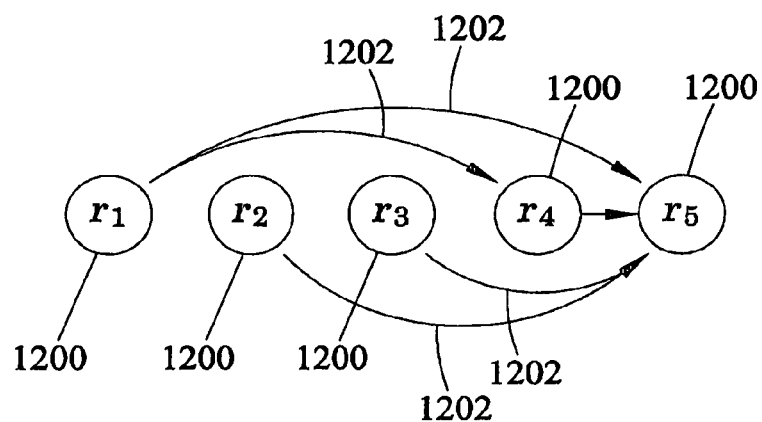
FIG. 12 is a policy directed acyclical graph (DAG) representation of the firewall rules given in Table 2.

For example, for the rules given in Table 2, the intersection of $r_1$ and $r_4$ yields (UDP, 1.1.*, *, *, 80). Again, the rule actions are not considered in the intersection or match operation. Since these two rules intersect, a packet can match both rules for example d=(UDP, 1.1.1.1, 80, 2.2.2.2, 80). The relative order must be maintained between these two rules and an edge drawn from $r_1$ to $r_4$ must be present in the DAG, as seen in FIG. 12. In FIG. 12, the policy DAG represents the rules in Table 2. Vertices 1200 indicate rules while edges 1202 indicate precedence relationships. Rules $r_2$ and $r_3$ in Table 2 provide an example of rules that can be re-ordered without changing the firewall policy. These two rules do not intersect due to the fifth tuple (destination port). A packet cannot match both rules indicating the relative order can change; therefore, an edge will not exist between them.

As described above, traditional firewall implementations consist of a single, dedicated machine, similar to a router, that applies the rule set to each arriving packet. However, packet filtering represents a significantly higher processing load than routing decisions [15, 18, 22]. For example, a firewall that interconnects two 100 Mbps networks would have to process over 300,000 packets per second [21]. Successfully handling these traffic loads becomes more difficult as rule sets become more complex [4, 14, 22]. Furthermore, firewalls must be capable of processing even more packets as interface speeds increase. In a high-speed environment (e.g. Gigabit Ethernet), a single firewall can easily become a bottleneck and is susceptible to DoS attacks [4, 7, 10, 11]. Building a faster single firewall is possible [8, 15, 18, 19, 20]; however, the benefits are temporary (traffic loads and interface speeds are increasing); it is not scalable; it is a single point of failure; and it is generally not cost-effective for all installations.

Figure 13A:
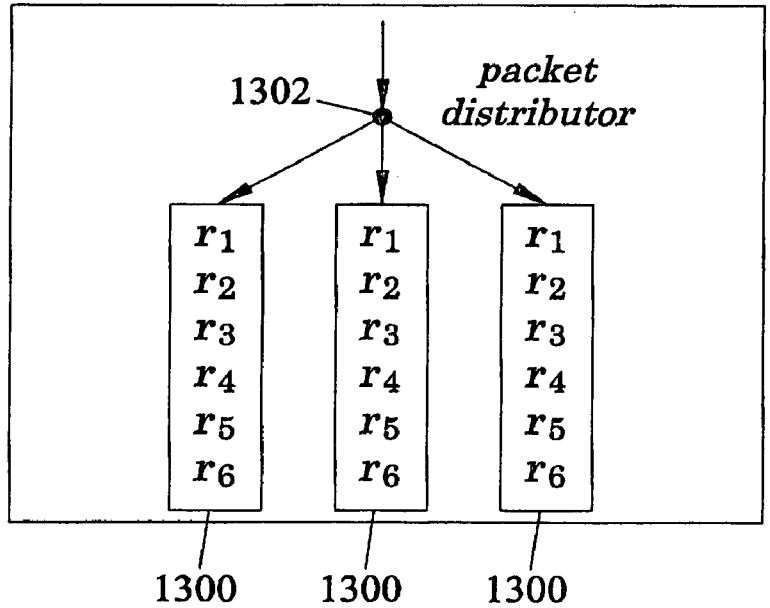
FIG. 13A is a block diagram illustrating rule distribution among a data-parallel firewall.
Figure 13B:
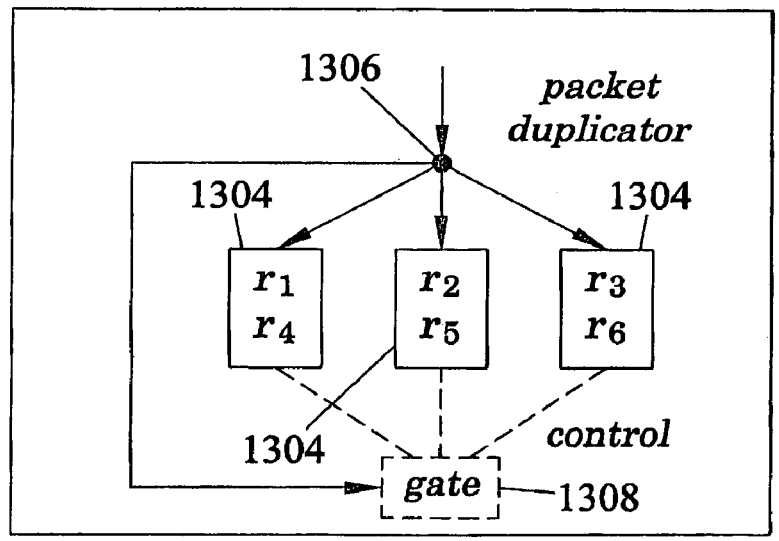
FIG. 13B is a block diagram illustrating a function-parallel firewall and rule distribution among nodes in the function-parallel firewall according to an embodiment of the subject matter described herein.

Parallelization has been demonstrated to offer a scalable approach for improving the performance of network firewalls. As seen in FIG. 13A, parallel designs consist of multiple firewalls, referred to as firewall nodes, connected in an array. In FIG. 13A, firewall nodes 1300 each implement a common rule set. A packet distributor 1302 load shares packets among firewall nodes 1300. In FIG. 13B, a function-parallel design is illustrated where firewall nodes 1304 implement different portions of a firewall rule set. A packet duplicator 1306 duplicates each packet to each firewall node. A gate 1308 controls packets entering the network based on control information received from firewall nodes 1304. The operation of the system illustrated in FIG. 13B will be described in more detail below.

The two designs depicted in FIGS. 13A and 13B are different based on what is distributed: packets or rules. For example, the design developed by Benecke et al consisted of multiple identical firewall nodes connected in parallel, as shown in FIG. 13A. Each firewall node implements the complete security policy R, and arriving packets are distributed across the firewall nodes for processing (one packet is sent to one firewall node) [4]; therefore different packets are processed in parallel. Using terminology developed for parallel computing, this design is considered data-parallel since the data (packets) is distributed across the firewall nodes [25]. How the load-balancing algorithm distributes the packets is vital to the data-parallel system and typically implemented as a specialized high-speed switch [11, 12]. Although data-parallel firewalls have been shown to achieve higher throughput than traditional firewalls and have a redundant design [4], they suffer from two major disadvantages. First, these designs have difficulty maintaining QoS across networks. For example, legitimate traffic can encounter delays if it is queued behind traffic that requires more processing. Under these circumstances, users notice poor network performance, which is a growing concern as more network applications require QoS assurances. Second, stateful inspection requires all traffic from a certain connection or exchange to traverse the same firewall node, which is difficult to perform at high speeds using the data-parallel approach [4, 14].

Rule Distribution and Function-Parallel Firewall

As described above, new scalable firewall designs are needed to cope with increasing traffic loads, network speeds, and security threats. To address these issues, one implementation of the subject matter described herein includes a firewall design that consists of multiple firewalls connected in parallel and a gate machine, as shown in FIG. 13B. Again in this design, the individual firewalls will be referred to as firewall nodes. However unlike the data-parallel design that distributes the packets, the function-parallel design distributes the policy rules across the firewall nodes. The distribution is done such that policy integrity is maintained. Therefore, a single traditional firewall and a function-parallel firewall will always give the same result for any packet. The rules distributed to a firewall node will be referred to as the local rule set or local policy. Using parallel computing terminology this design will be referred to as function-parallel, since the rules are distributed across the firewall nodes [25].

The general operation of one exemplary function-parallel system can be described as follows. When a packet arrives to the function-parallel system, the packet is forwarded to every firewall node. Each firewall node processes the packet using its local rule list. The firewall node then signals the gate indicating either no match was found or provides the rule number and action if a match was found. Therefore, no match is a valid response and is required for this basic function-parallel design. The gate keeps track of the results and determines the final action to perform on the packet. For example, a first match policy can be implemented by applying the action of the lowest numbered matching rule to the packet.

The performance of this basic design can be improved by allowing the firewall nodes to pipeline packets [25]. For example, once a firewall node has completed processing a packet, it can immediately begin processing the next packet. This allows the firewall nodes to work independently, thus increasing the overall system performance. However, pipelining requires the gate to keep track of multiple packets simultaneously. Performance can also be increased if the gate can signal the firewall nodes that further processing of a certain packet is no longer needed (similar to short-circuit evaluation). This occurs when the appropriate match has been found by a firewall node before the other firewall nodes have completed processing the same packet. Short-circuit evaluation requires the gate to know how the rules are distributed as well as the dependencies, which is discussed in detail below.

The function-parallel design has several significant advantages over traditional and data-parallel firewalls. First, the function-parallel design results in the faster processing since every firewall node is utilized to process a single packet.

Reducing the processing time, instead of the arrival rate (the data-parallel paradigm), yields better performance that will be proven theoretically and demonstrated experimentally. Second, unlike the data-parallel design, function-parallel can maintain state information about existing connections. Maintaining state can be viewed as the addition of a new rule corresponding to a requested connection. Unlike the data-parallel design, the new rule can be placed in any firewall node since a packet will be processed by every firewall node. Third, the function-parallel design has the unique ability to provide service differentiation between classes of traffic; therefore, the design can provide QoS requirements. Finally, the function-parallel system can be implemented using any current firewall system (as discussed below, the gate can be removed), without any specialized hardware. The disadvantage of the system is the limited scalability, since the system cannot have more firewall nodes than rules, unless data-redundancy is provided. However, given the size of most firewall policies range in the thousands to hundred of thousands of rules, which is expected to increase, the scalability limit is not an important concern.

The operation and performance of the function-parallel design depends on the correct distribution of policy rules. Rule distribution techniques that maintain integrity, increase processing speed, allow redundancy and robustness, and eliminate the gate are described in the following sections.

Rule Distribution and Policy Integrity

As described above, the function-parallel design distributes the security policy rules across an array of firewall nodes. Using this design, all the firewall nodes process an arriving packet in parallel using its local rule set. The rules must be distributed such that the integrity of the policy is maintained. Again, it will be assumed in the examples described herein that a first-match policy is desired. Therefore, the distribution of the rules must not introduce any anomalies into the original rule list, such as shadowing.

Figure 14A:
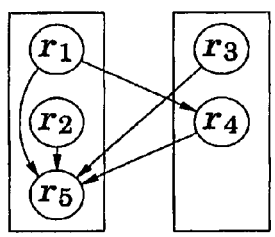
FIG. 14A is a block diagram illustrating one exemplary rule distribution among nodes in a function-parallel firewall according to an embodiment of the subject matter described herein.
Figure 14B:
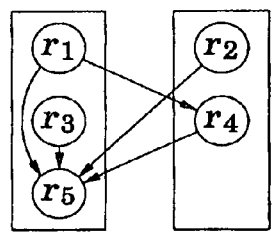
FIG. 14B illustrates another distribution of rules among nodes in a function-parallel firewall according to an embodiment of the subject matter described herein.
Figure 14C:
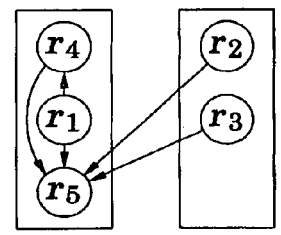
FIG. 14C illustrates an illegal rule distribution among nodes in a function-parallel firewall.

Let m be the number of firewall nodes in the system and j be a firewall node j=1 . . . m. Each firewall node has a local rule set that is a portion of the security policy. Denote the local rule list for firewall node j as $R_j$ that has $n_j$ rules. The firewall node j will process an arriving packet using the local rule list in a top-down fashion to find the first match. It should be noted that a software implementation of the firewall node according to the subject matter described herein is not required to have a rule list. The function-parallel design is independent of software implementation. In this scenario integrity is maintained under two conditions: every rule is assigned to at least one firewall node, and a policy DAG edge never traverses upward within a firewall node. The first condition assures every rule in the original policy exists in the function-parallel system, while the second condition prevents rule shadowing within a firewall node. Consider a two-firewall node system and the five-rule policy given in Table 2. Possible rule distributions are depicted in FIGS. 14A-14C. The distribution illustrated in FIG. 14A will be referred to as vertical, while the distribution illustrated in FIG. 14B will be referred to as horizontal. In both cases the five rules are present and all policy DAG edges are downward; thus integrity is maintained. In contrast, FIG. 14C is an illegal distribution because rule $r_4$ shadows $r_1$ (upward policy DAG edge).

The gate can also utilize the policy DAG to determine the first match, and if a short-circuit evaluation can occur. For example consider the distribution illustrated in FIG. 14A. Assume a packet matches $r_3$ in the second firewall node and this result is reported to the gate. Using the policy DAG, the gate can determine this is the first match, since it is impossible for a packet that matches $r_3$ to also match any rules that preceded it in the original policy (rules $r_1$ or $r_2$). The gate can inform the remaining firewall nodes to stop processing the packet.

Optimal Rule Distribution

The previous section described the distribution requirements for maintaining policy integrity. However it was proven in [27] that any linear arrangement of a policy DAG maintains integrity, which also holds for a local policy DAG. Furthermore as evident in the previous section, many different distributions are possible. Given the possible rule distributions for the function-parallel design, a distribution is sought that minimizes the average number of comparisons required per packet [27].

Achieving this goal will require information not present in the firewall rule list. Certain firewall rules have a higher probability of matching a packet than others. As a result, it is possible to develop a policy profile over time that indicates frequency of rule matches (similar to cache hit ratio). Let $P=\{p_1, p_2, \ldots, p_n\}$ be the policy profile, where $p_i$ be the probability that a packet will match rule $r_i$ (first match in the policy). Furthermore, assume a packet will always find a match, $$\sum_{i=1}^{n} p_i = 1;$$

therefore R is comprehensive. Using this information, the average number of rule comparisons required for the policy R using a standard single machine firewall is $$E(R) = \sum_{i=1}^{n} i \cdot p_i \qquad (4)$$

This equation also applies to firewall nodes. However, the rules of a local policy include rules of the original policy; therefore, a mapping between the local and original policy rules is needed. Let $r_{i,j}$ represent the $i^{th}$ rule of firewall node j, that corresponds a certain rule in the original rule list R. Consider the local rule list for the second firewall node depicted in FIG. 14A. The local policy is $R_2=\{r_4, r_5\}$, where $r_{1,2}=r_4$ and $r_{2,2}=r_5$. Similarly, let $p_{i,j}$ be the probability of matching the $i^{th}$ rule of firewall node j. Therefore the average number of comparisons required for firewall node j is $$E(R_J) = \sum_{i=1}^{n_j} i \cdot p_{i,j} \qquad (5)$$

Using the previous equation, the average number of comparisons required for the function-parallel system is $$E_f(R) = \sum_{j=1}^{m} E(R_j) = \sum_{j=1}^{m} \sum_{i=1}^{n_j} i \cdot p_{i,j} \qquad (6)$$

For example, the average number of comparisons required for the distribution given in FIG. 14A is 2.24, while the average number of comparisons for the distribution given in FIG. 14B is 2.45.

Given a policy DAG G=(R,E) and policy profile P, a distribution is sought that minimizes Equation 6. In the absence of precedence relationships, the average number of comparisons is minimized if the rules are sorted in non-increasing order according to the probabilities [28], which is also referred to as Smith's algorithm [29]. The sorted rules are then distributed in a horizontal fashion, as depicted in FIG. 14B. Precedence constraints cause the problem to be more realistic; however, precedence constraints also make determining the optimal permutation more problematic. In [27] determining the optimal rule order for a single machine firewall is proven to be NP-complete; therefore, so is determining the optimal function-parallel rule distribution. However, [27] presents a simple sorting algorithm to improve the optimal order, that can be modified to apply to function-parallel rule distribution. This modified algorithm sorts the policy rules using the method described in [27], then distributes the rules in a horizontal fashion.

Redundancy

Similar to the traditional and data-parallel firewalls, a disadvantage of the current function-parallel design is its inability to withstand a single firewall node failure. If a single firewall node fails in the function-parallel system, then part of the policy is lost and integrity is not maintained. A simple solution commonly used for traditional firewalls is to duplicate the entire system; however, this solution is cost prohibitive, not efficient, and difficult to manage.

Figure 15A:
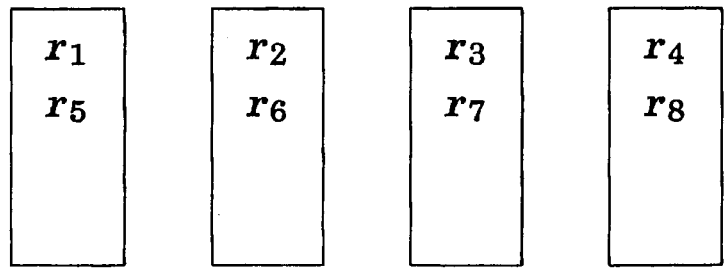
FIG. 15A is a block diagram illustrating non-redundant rule distribution among nodes in a function-parallel firewall according to an embodiment of the subject matter described herein.
Figure 15B:
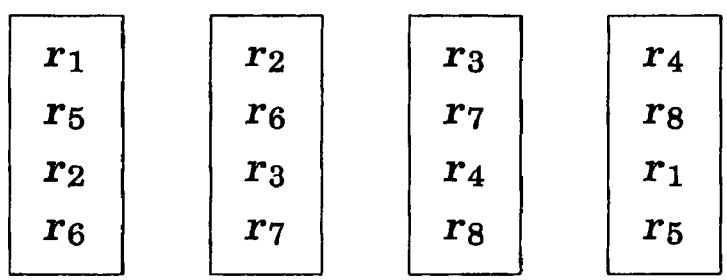
FIG. 15B is a block diagram illustrating redundant rule distribution among nodes in a function-parallel firewall according to an embodiment of the subject matter described herein.

Redundancy can be provided in the function-parallel design by replicating rules, instead of firewall nodes. Consider the function-parallel system depicted in FIG. 15A, that includes four firewall nodes and an eight-rule policy distributed in a horizontal manner. If the local rule list of the right neighbor is added to the end of every firewall node, as illustrated in FIG. 15B, then any non-continuous firewall nodes can fail and integrity will be maintained. It should be noted that the criteria for maintaining integrity still apply: every rule must be implemented at a node and no upward edges in the local policy DAG. Furthermore, the redundant design requires short-circuit evaluations to prevent multiple firewall nodes from evaluating the same rule.

Gateless Design

The gate plays an important role in the function-parallel design. It accepts information from the firewall nodes to determine the correct action to apply to a packet. Unfortunately, the gate is a special device that must coordinate with the individual firewall nodes in the system, which may be problematic to implement. However, it is possible to eliminate the gate and allow the firewall nodes to operate independently without any coordination. The significant advantage is that the gateless function-parallel design can be implemented with any firewall system (from open source to proprietary).

Figure 16A:
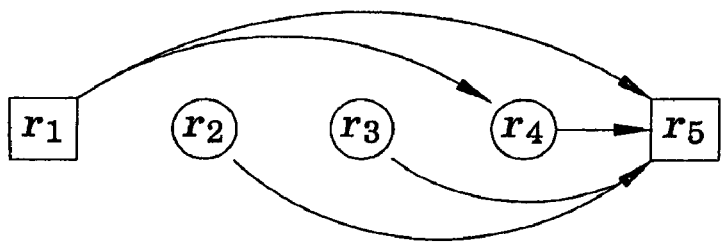
FIG. 16A illustrates a policy DAG where deny rules are indicated by a square node.
Figure 16B:
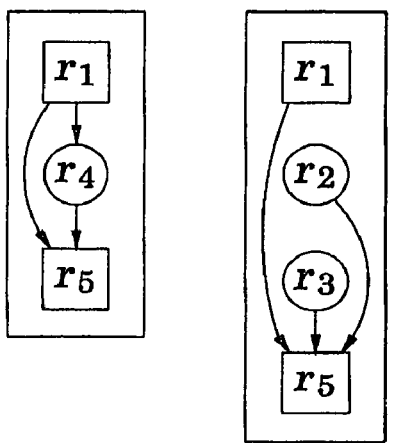
FIG. 16B is a block diagram illustrating initial gateless rule distribution among nodes in a function-parallel firewall according to an embodiment of the subject matter described herein.
Figure 16C:
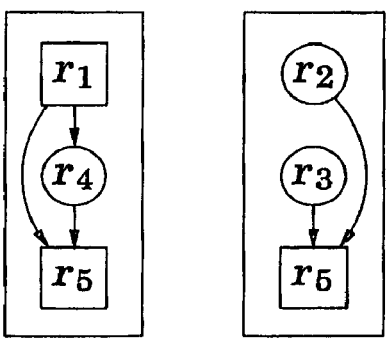
FIG. 16C is a block diagram illustrating final gateless rule distribution among nodes in a function-parallel firewall according to an embodiment of the subject matter described herein.

Eliminating the gate requires a rule distribution such that for any given packet, only one machine will ever accept and the remaining machines will always deny. As described above, rule actions are either accept or deny. This can be seen in the policy DAG by denoting deny rules with a square and accept rules with a circle. To assure only one machine will accept a packet, an accept rule in a firewall node cannot intersect with another accept rule in any other firewall node. As described above, the intersection of two rules describes the set of packets that can match both rules. If an edge spans the local rules of firewall nodes, then the set of packets would be accepted by both firewall nodes; thus, duplicate packets would be accepted. In addition, every drop rule must be present in each firewall node to assure the remaining firewall nodes will drop the packet. Given these two requirements a policy DAG edge will not span firewall nodes, as illustrated in FIGS. 16B and 16C.

For example, consider a two-firewall node function-parallel system that implements the five-rule policy given in Table 2. The policy DAG is given in FIG. 16A, where the first and last rules are deny. An initial gateless rule distribution is given in FIG. 16B which has no edges spanning the firewall nodes. Given the local policy DAG, deny rules can be removed if: no inbound edges exist for the deny rule; and all out-going edges for the deny rule connect to a superset deny rule. Using these constraints, the first rule in the second firewall node depicted in FIG. 16B can be removed (it is a subset of $r_5$ and has no other edges). This gives the final gateless rule distribution shown in FIG. 16C. As a result, the first firewall node in this distribution will only process UDP traffic, while the second machine only processes TCP. The rules can be divided with respect to other tuples, and can be done to provide QoS guarantees.

Theoretical Results

Assuming arrivals and service times are exponentially distributed, a firewall system can be considered an open network of M/M/1 queues (Jackson network) [5, 17]. Probabilities can be assigned to each link to indicate the likelihood of moving to the next node, which are given from the policy profile (hit ratio) described above. The average end-to-end delay for q cascading machines (traversal path) can be computed as $$E(T) = \sum_{i=1}^{q} \frac{1}{\mu_i - \lambda_i} \tag{7}$$

where $1/\mu_i$ is the service time (processing and transmission) and $\lambda i$ is the arrival rate to node i. As a result, we have a theoretical model for the average delay across a firewall system. Consider the data-parallel and functional-parallel firewall designs given in FIGS. 13A and 13B. Assume each system consists of m machines and implements the same n rule security policy. Let the total arrival rate to each system be $\lambda$ packets per unit time and each node performs x rules per unit time.

For the data-parallel firewall, traffic arrives at the packet distributor, which evenly distributes the traffic. As a result the arrival rate to each machine is $\lambda$ m. The service rate is x n, since each node implements the complete rule set. The end-to-end delay across any machine in the parallel firewall is $$E_d(T) = \frac{1}{\frac{x}{n} - \frac{\lambda}{m}} \tag{8}$$

In contrast, rules are distributed across each machine, in the function-parallel firewall. Furthermore, all traffic arriving to the system is forwarded to each machine. If we assume the rules in each machine are independent (no policy DAG edges spanning machines), then the end-to-end delay across any machine in the functional-parallel firewall is $$E_f(T) = \frac{1}{\frac{m \cdot x}{n} - \lambda} \tag{9}$$

The reduction in delay compared to a data-parallel firewall system is 1 m; therefore, the functional-parallel system has the potential to be m times faster than a (data) parallel system. However, the scalability of the functional-parallel system is dependent on the rule set.

Figure 17A:
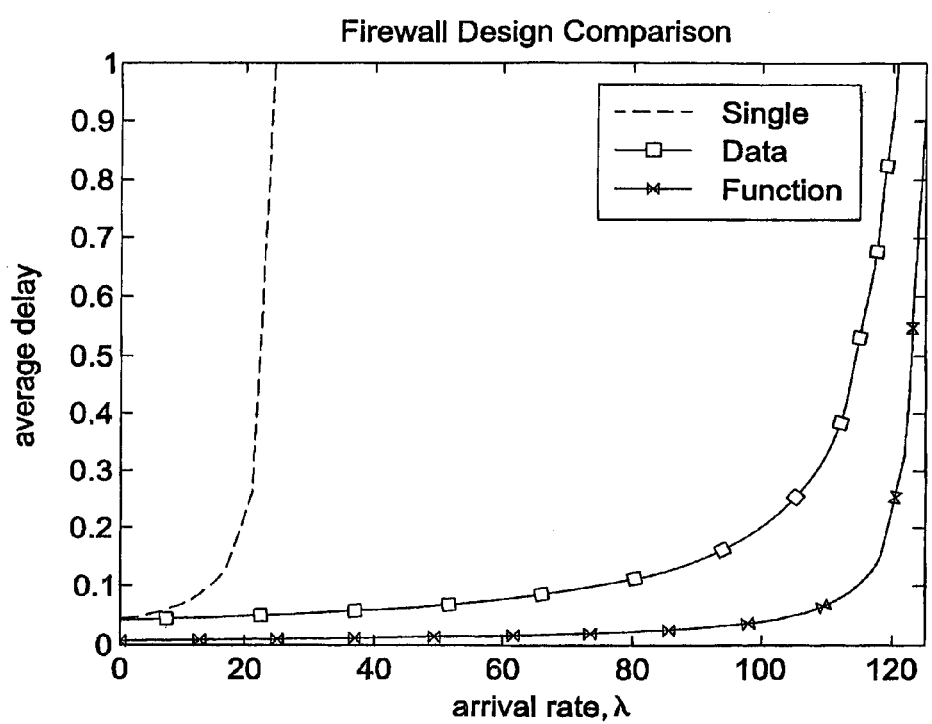
FIG. 17A is a graph illustrating simulation results for average packet delay as packet arrival rate increases for different firewall designs.
Figure 17B:
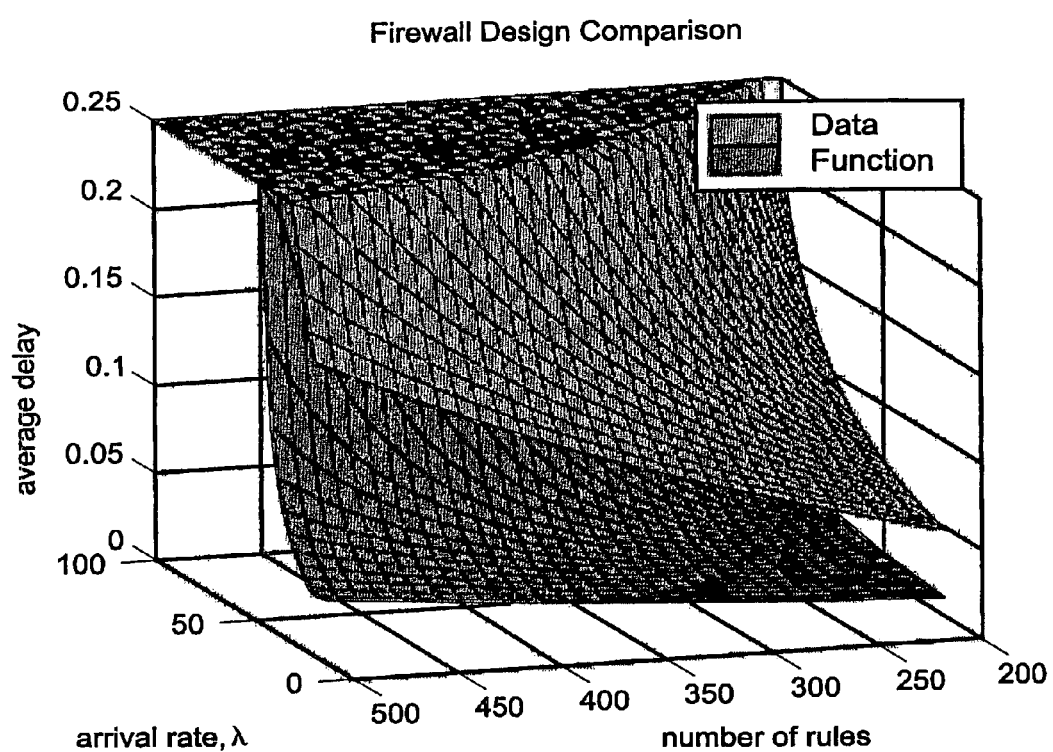
FIG. 17B is a graph illustrating simulation results for packet delay as the arrival rate and number of rules increase for different firewall designs.

FIGS. 17A and 17B compare the performance of function-parallel, data-parallel, and single firewall designs. More particularly, FIG. 17A compares the average among the different firewall designs as the arrival rate λ increases. As can be seen from FIG. 17A, the function-parallel design achieves lower average delay as the arrival rate increases than the data-parallel design. FIG. 17B illustrates the average delay as arrival rate and the number of rules increase. In FIG. 17B, the function-parallel design again achieves better simulated performance than the data-parallel design.

Experimental Results

The previous section described models that provide insight to the average delay across different firewall designs. This information is beneficial in guiding initial design; however, we are also interested in the maximum delay encountered. For this reason, a discrete event simulator has been developed to model the different systems.

Figure 18A:
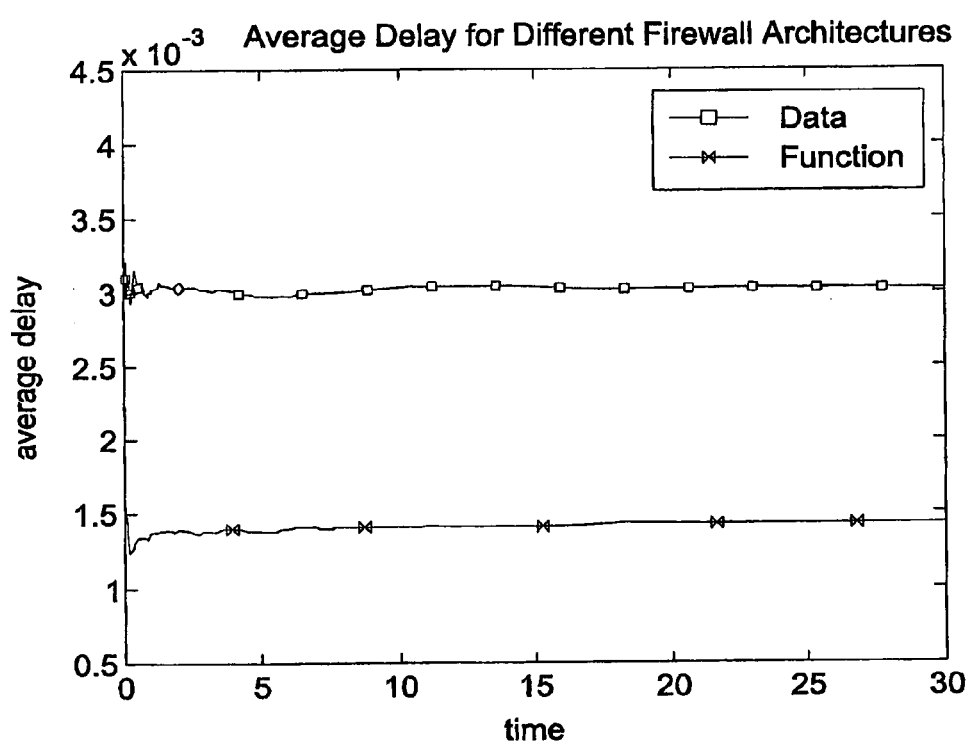
FIG. 18A is a graph illustrating simulation results for average packet delay for different firewall architectures.
Figure 18B:
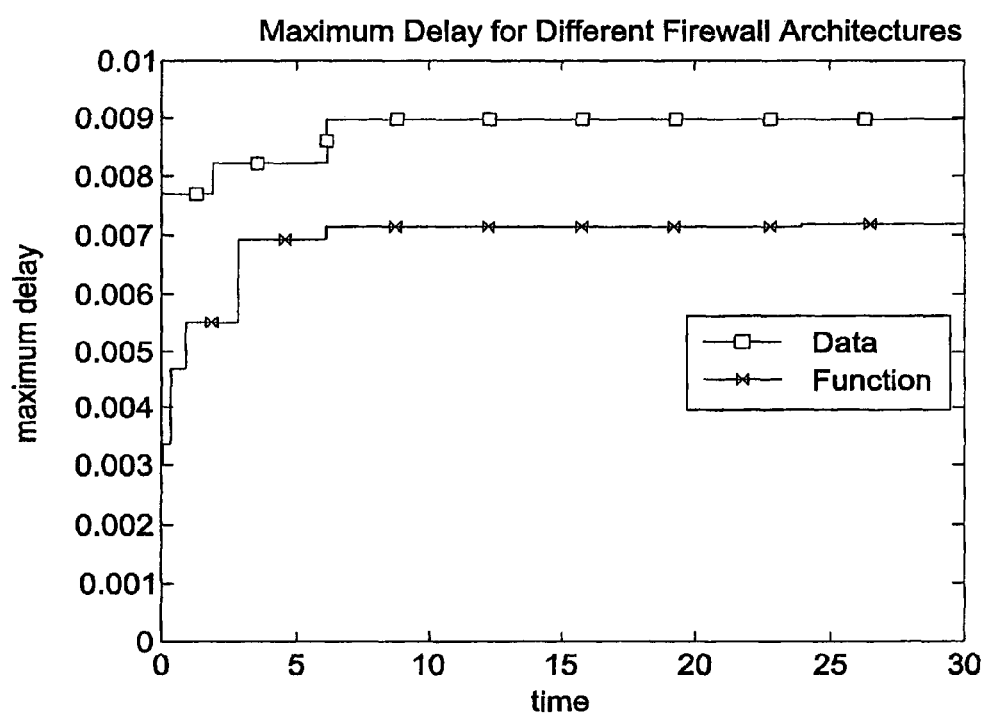
FIG. 18B is a graph illustrating simulation results for maximum packet delay for different firewall architectures.

The data-parallel firewall and function-parallel firewall designs were simulated, where both systems implemented a 50-rule policy and each consisted of 5 firewall nodes. Three classes of traffic were modeled, first, second, and background. The first and second classes represent legitimate traffic that was eventually accepted by the firewall system, while background traffic was typically dropped. The two designs were simulated under normal conditions, where each traffic type had the same volume. FIGS. 18A and 18B shows the simulation results. As seen in FIG. 18A and predicted by the theoretical models, the average delay encountered by packets in the functional-parallel design was lower than the data-parallel designs. The function-parallel design also provided lower maximum delays than the data-parallel, as seen in FIG. 18B. In summary, the theoretical models and simulation results indicate function-parallel is a better design than a traditional single firewall system or a data-parallel system; yet, function-parallel requires no more computing resources than data-parallel.

Summary

Figure 19:
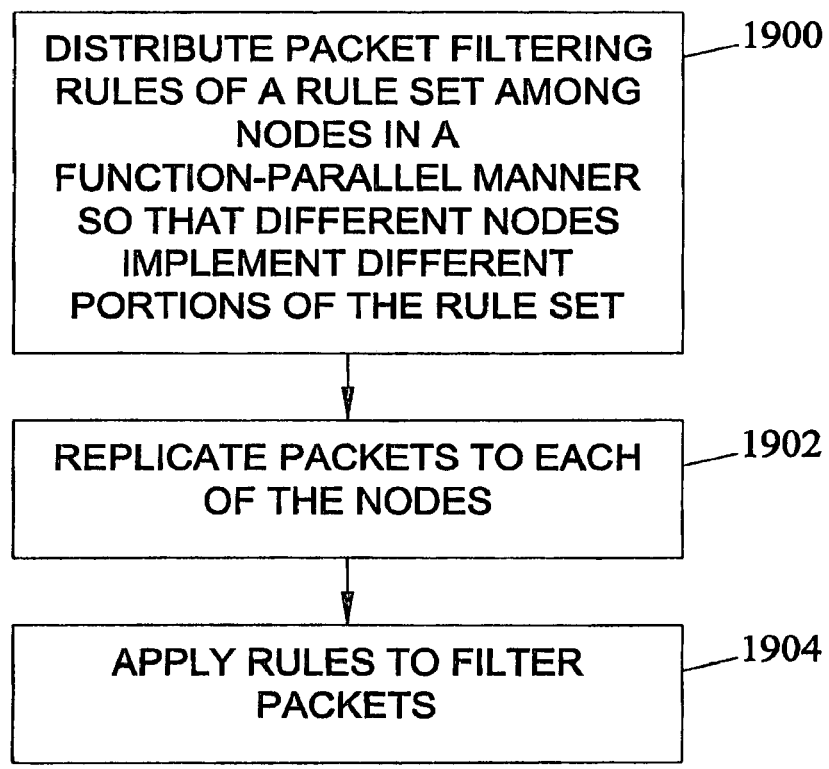
FIG. 19 is a flow chart illustrating exemplary steps for filtering packets using a rule set distributed among nodes in a function-parallel manner according to an embodiment of the subject matter described herein.

Thus, as described above, the subject matter described herein includes methods, systems, and computer program products for providing a function-parallel firewall where different portions of a firewall rule set are distributed among different firewall nodes. FIG. 19 is a flow chart illustrating exemplary steps of a process for filtering packets using a rule set distributed among firewall nodes in a function-parallel manner. Referring to FIG. 19, in step 1900, packet filtering rules of a rule set are distributed among nodes in a function-parallel manner so that different nodes implement different portions of the rule set. In step 1902, packets to be filtered are replicated to each of the nodes. In step 1904, the packets to be filtered are replicated to each of the nodes. In a hierarchical design, step 1904 may be implemented at each level in the hierarchy. If a packet passes or fails at one level, the packet may be forwarded into a network or dropped, depending on the distribution of the rule set. In step 1904, the rules are applied to filter the packets.

The steps illustrated in FIG. 19 and in all of the examples described herein may be applied to firewall systems that filter packets based on packet header information, intrusion detection systems that filter packets based on packet payload information, or intrusion protection systems that filter packets based on a combination of packet header and packet payload information.

The following references correspond to the citations in this document. The disclosure of each of these references is hereby incorporated herein by reference it its entirety.

REFERENCES

[1] A. V. Aho, J. E. Hopcroft, and J. D. Ullman. *Data Structures and Algorithms*. Addison-Wesley, 1987.

[2] M. Al-Suwaiyel and E. Horowitz. Algorithms for Trie Compaction. *ACM Transactions on Database Systems*, 9(2):243-263, June 1984.

[3] S. M. Bellovin and W. Cheswick. Network Firewalls. *IEEE Communications Magazine*, pages 50-57, September 1994.

[4] C. Benecke. A Parallel Packet Screen for High Speed Networks. In *Proceedings of the 15th Annual Computer Security Applications Conference*, 1999.

[5] G. Bolch, S. Greiner, H. de Meer, and K. S. Trivedi. *Queueing Networks and Markov Chains*. John Wiley and Sons, Inc., 1998.

[6] D. Corner. Analysis of a Heuristic for Full Trie Minimization. *ACM Transactions on Database Systems*, 6(3):513-537, September 1981.

[7] U. Ellermann and C. Benecke. Firewalls for ATM Networks. In *Proceedings of INFOSEC'COM*, 1998.

[8] D. Eppstein and S. Muthukrishnan. Internet Packet Filter Management and Rectangle Geometry. In *Proceedings of the Symposium on Discrete Algorithms*, pages 827-835, 2001.

[9] E. Fulp, Z. Fu, D. S. Reeves, S. F. Wu, and X. Zhang. Preventing Denial of Service Attacks on Quality of Service. In *Proceedings of the 2001 DARPA Information Survivability Conference and Exposition II*, 2001.

[10] R. Funke, A. Grote, and H.-U. Heiss. Performance Evaluation of Firewalls in Gigabit-Networks. In *Proceedings of the Symposium on Performance Evaluation of Computer and Telecommunication Systems*, 1999.

[11] X. Gan, T. Schroeder, S. Goddard, and B. Ramamurthy. LSMAC vs. SLNAT: Scalable ClusterbasedWeb Servers. *Journal of Networks, Software Tools, and Applications*, 3(3):175-185, 2000.

[12] S. Goddard, R. Kieckhafer, and Y. Zhang. An Unavailability Analysis of Firewall Sandwich Configurations. In *Proceedings of the 6th IEEE Symposium on High Assurance Systems Engineering*, 2001.

[13] A. Hari, S. Suri, and G. Parulkar. Detecting and Resolving Packet Filter Conflicts. In *Proceedings of IEEE INFOCOM*, pages 1203-1212, 2000.

[14] O. Paul and M. Laurent. A Full Bandwidth ATM Firewall. In *Proceedings of the 6th European Symposium on Research in Computer Security ESORICS'2000*, 2000.

[15] L. Qui, G. Varghese, and S. Suri. Fast Firewall Implementations for Software and Hardware-Based Routers. In *Proceedings of ACM SIGMETRICS*, June 2001.

[16] G. V. Rooij. Real Stateful TCP Packet Filtering in IP Filter. In *Proceedings of the 10th USENIX Security Symposium*, 2001.

[17] M. Schwartz. *Telecommunication Networks: Protocols, Modeling, and Analysis*. Addison-Wesley, 1987.

[18] S. Suri and G. Varghese. Packet Filtering in High Speed Networks. In *Proceedings of the Symposium on Discrete Algorithms*, pages 969-970, 1999.

[19] P. Warkhede, S. Suri, and G. Varghese. Fast Packet Classification for Two-Dimensional Conflict-Free Filters. In *Proceedings of IEEE INFOCOM*, pages 1434-1443, 2001.

[20] J. Xu and M. Singhal. Design and Evaluation of a High-Performance ATM Firewall Switch and Its Applications.

IEEE Journal on Selected Areas in Communications, 17(6):1190-1200, June 1999.

[21] R. L. Ziegler. *Linux Firewalls*. New Riders, second edition, 2002.

[22] E. D. Zwicky, S. Cooper, and D. B. Chapman. *Building Internet Firewalls*. O'Reilly, 2000.

[23] E. Al-Shaer and H. Hamed. Modeling and Management of Firewall Policies. *IEEE Transactions on Network and Service Management*, 1(1), 2004.

[24] S. M. Bellovin and W. Cheswick. Network Firewalls. *IEEE Communications Magazine*, pages 50-57, September 1994.

[25] D. E. Culler and J. P. Singh. *Parallel Computer Architecture: A Hardware/Software Approach*. Morgan Kaufman, 1999.

[26] E. W. Fulp. Firewall Architectures for High Speed Networks. Technical Report 20026, Wake Forest University Computer Science Department, 2002.

[27] E. W. Fulp. Optimization of Firewall Policies Using Directed Acyclical Graphs. Submitted for publication, 2004.

[28] R. Rivest. On Self-Organizing Sequential Search Heuristics. *Communications of the ACM*, 19(2), 1976.

[29] W. E. Smith. Various Optimizers for Single-Stage Production. *Naval Research Logistics Quarterly*, 3:59-66, 1956.

It will be understood that various details of the present subject matter may be changed without departing from the scope of the present subject matter. Furthermore, the foregoing description is for the purpose of illustration only, and not for the purpose of limitation.

What is claimed is:

1. A function-parallel firewall comprising:
   (a) a first firewall node for filtering received packets using a first portion of a rule set including a plurality of rules, the first portion including less than all of the rules in the rule set; and
   (b) at least one second firewall node for filtering packets using a second portion of the rule set, the second portion including at least one rule in the rule set that is not present in the first portion, wherein the first and second portions together include all of the rules in the rule set, wherein the first and second firewall nodes are configured to implement a gateless design wherein the rules are distributed among the first and second firewall nodes such that for any given packet, only one of the first and the at least one second firewall nodes accepts the packet and the other of the first and at least one second firewall nodes always denies the packet, wherein each of the packets is replicated to each of the firewall nodes and wherein the first firewall node is adapted to forward packets that pass one of the rules in the first portion to an internal network in a manner that bypasses the at least one second firewall node.

2. The function-parallel firewall of claim 1 wherein the first and second portions respectively include rules present in first and second levels of a firewall hierarchy.

3. The function-parallel firewall of claim 2 wherein the first and second firewall nodes are connected to each other such that the rules in the first level are applied to received packets before the rules in the second level.

4. The function-parallel firewall of claim 3 wherein the first firewall node is adapted to discard packets that fail one of the rules in the first portion.

5. The function-parallel firewall of claim 3 wherein the rules in the second portion are more processor-intensive than the rules in the first portion.

6. The function-parallel firewall of claim 1 wherein the first and second firewall nodes implement rules of the same hierarchical level.

7. The function-parallel firewall of claim 1 wherein at least one of the rules in the first portion is present in the second portion to provide redundancy.

8. The function-parallel firewall of claim 1 wherein the first and second firewall nodes are implemented on different physical machines.

9. The function-parallel firewall of claim 1 wherein the first and second firewall nodes are implemented on different processors in the same machine.

10. The function-parallel firewall of claim 1 wherein the first and second firewall nodes are adapted to simultaneously process copies of the same packets.

11. The function-parallel firewall of claim 1 wherein the rule set includes firewall rules for filtering packets based on packet headers.

12. The function-parallel firewall of claim 1 wherein the rule set includes intrusion detection rules for filtering packets based on packet payloads.

13. The function-parallel firewall of claim 1 wherein the rule set includes intrusion protection rules for filtering packets based on a combination of packet headers and packet payloads.

14. A stateful function-parallel firewall system comprising:
   (a) a first function-parallel firewall subsystem including a plurality of firewall nodes implementing a first rule set for filtering packets arriving in a network, wherein the first function-parallel firewall subsystem includes at least first and second firewall nodes respectively implementing first and second portions of the first rule set, the first portion including at least one rule that is not present in the second portion; and
   (b) a second function-parallel firewall sub-system including a second set of firewall nodes implementing a second rule set for filtering packets departing from the network, wherein the second function-parallel firewall subsystem includes at least third and fourth firewall nodes, the third and fourth firewall nodes implementing first and second portions of the second rule set, the first portion of the second rule set including at least one rule that is not present in the second portion of the second rule set, wherein the first and second function-parallel firewall subsystems share state information regarding connections established through the first and second sets of firewall nodes, wherein the first and second function-parallel firewall subsystems each include a gateless design wherein rules are distributed among individual firewall nodes such that any given packet is accepted by a only single firewall node and is always denied by all of the remaining firewall nodes, wherein each of the packets is replicated to each of the firewall nodes, and wherein a packet that is accepted by one of the firewall nodes is forwarded to an internal network in a manner that bypasses the remaining firewall nodes.

15. The stateful function-parallel firewall system of claim 14 comprising a database node coupled to the first and second function-parallel firewall subsystems, wherein the database node stores the state information, wherein the first set of firewall nodes obtains state information regarding connections established through the second set of firewall nodes from the database node, and wherein the second set of firewall nodes obtains state information regarding connections established through the first set of firewall nodes from the database node.

16. The stateful function-parallel firewall system of claim 15 wherein the first and second sets of firewall nodes store copies of the state information maintained by the database node.

17. The stateful function-parallel firewall system of claim 14 wherein the firewall nodes of the first subsystem are adapted to simultaneously process copies of the same packets arriving in the network and wherein the firewall nodes in the second subsystem are adapted to simultaneously process copies of packets departing from the network.

18. The stateful function-parallel firewall system of claim 14 wherein the first and second rule sets include firewall rules for filtering packets based on packet header information.

19. The stateful function-parallel firewall system of claim 14 wherein the first and second rule sets include intrusion detection rules for filtering packets based on payloads of the packets.

20. The stateful function-parallel firewall system of claim 14 wherein the first and second rule sets include intrusion protection rules for filtering packets based on a combination of packet header and packet payload information.

21. A firewall grid comprising:
(a) a plurality of firewall nodes being physically connected to each other via a network for filtering packets; and
(b) a controller for controlling logical connections between the firewall nodes, wherein the controller is adapted to configure the firewall nodes in a logical firewall hierarchy without changing physical connections between the firewall nodes, wherein the firewall nodes are configured to implement a gateless design wherein the rules are distributed among the firewall nodes such that for any given packet, only one of the firewall nodes accepts the packet and all of the remaining firewall nodes always deny the packet, wherein each of the packets is replicated to each of the firewall nodes, and wherein a packet that is accepted by one of the firewall nodes is forwarded to an internal network in a manner that bypasses the remaining firewall nodes.

22. The firewall grid of claim 21 wherein the firewall nodes are adapted to simultaneously process copies of the same packets.

23. The firewall grid of claim 21 wherein the logical firewall hierarchy comprises a function-parallel hierarchy where individual firewall nodes implement different portions of a rule set.

24. The firewall grid of claim 21 wherein the controller is adapted to detect congestion at a first level in the firewall hierarchy and is adapted to reconfigure the logical connections between the firewall nodes to add a firewall node from another level in the firewall hierarchy to the level at which congestion was detected.

25. A system for providing network access control based on a function-parallel policy, the system comprising:
(a) a first firewall node for filtering received packets using a first portion of a rule set including a plurality of rules, the first portion including less than all of the rules in the rule set; and
(b) at least one second firewall node for filtering packets using a second portion of the rule, the second portion including at least one rule in the rule set that is not present in the first portion, wherein the first and second portions together include all of the rules in the rule set, wherein the first and second nodes are configured to implement a gateless design wherein the rules are distributed among the first and second firewall nodes such that for any given packet, only one of the first and second firewall nodes accepts the packet and the other of the first and second firewall nodes always denies the packet, wherein each of the packets is replicated to each of the firewall nodes, and wherein a packet that is accepted by one of the firewall nodes is forwarded to an internal network in a manner that bypasses the remaining firewall nodes.

26. The system of claim 25 wherein the rule set includes firewall rules for filtering packets based on packet header information.

27. The system of claim 25 wherein the rule set includes intrusion detection rules for filtering packets based on packet payload information.

28. The system of claim 25 wherein the rule set includes intrusion protection rules for filtering packets based on a combination of packet header and packet payload information.

29. A method for controlling access to a network based on a set of packet filtering rules distributed in a function-parallel manner, the method comprising:
(a) distributing packet filtering rules of a rule set among a plurality of different firewall nodes in a function-parallel manner so that at least some of the different nodes implement different portions of the rule set;
(b) replicating packets to each of the nodes; and
(c) applying the rules to filter the packets, wherein distributing the packet filtering rule set among the plurality of firewall nodes includes distributing the rules such that for any given packet, only one of the firewall nodes accepts the packet and all of the remaining nodes always deny the packet, wherein each of the packets is replicated to each of the firewall nodes, and wherein a packet that is accepted by one of the firewall nodes is forwarded to an internal network in a manner that bypasses the remaining firewall nodes.

30. The method of claim 29 wherein the packet filtering rules comprise firewall rules for filtering packets based on packet header information.

31. The method of claim 30 comprising, at the other nodes, ceasing processing of the first packet.

32. The method of claim 29 wherein the packet filtering rules comprise intrusion detection rules for filtering packets based on packet payload information.

33. The method of claim 29 wherein the packet filtering rules comprise intrusion protection rules for filtering packets based on a combination of packet header and packet payload information.

34. The method of claim 29 comprising, receiving a first packet at a first node, determining whether the packet matches a first rule implemented by the first node, and, in response to determining that a match occurs, notifying the other nodes of the match.

35. A method for distributing rules in a function-parallel firewall, the method comprising:
(a) defining a rule set for a function-parallel firewall;
(b) assigning rules in the rule set to nodes and branches in a trie data structure, wherein each node in the trie data structure corresponds to a data field and each branch represents a value for each data field to be compared to values in corresponding fields in received packets;
(c) pruning the trie data structure in a manner that preserves ordering of the rules in the rule set; and
(d) assigning rules to firewall nodes such that one node is assigned a rule that will accept a given packet and the remaining firewall nodes of the firewall are assigned rules that will deny the packet, wherein the firewall nodes implement a gateless design such that for any given packet only one node accepts the packet and all of the remaining nodes always deny the packet, wherein each of the packets is replicated to each of the firewall nodes, and wherein a packet that is accepted by one of the firewall nodes is forwarded to an internal network in a manner that bypasses the remaining firewall nodes.

36. The method of claim 35 wherein pruning the trie data structure includes pushing a rule to its descendants and deleting the original rule.

37. The method of claim 35 comprising reducing the depth of the trie using level reordering.

38. The method of claim 35 wherein assigning rules in the rule set to nodes and branches in the trie data structure includes assigning rules requiring longer processing time to lower levels in the trie.

39. A method for assigning rules to a plurality of firewall nodes, the method comprising:
  (a) assigning packet filtering rules to nodes in a directed acyclical graph (DAG);
  (b) representing relationships between rules by edges in the DAG; and
  (c) distributing the rules among a plurality of firewall nodes using the DAG such that different firewall nodes implement different rules and such that relationships between the rules specified in the DAG are preserved, wherein distributing the rules among a plurality of firewall nodes includes distributing the rules such that for a given packet, only one of the firewall nodes accepts the packet and all of the remaining firewall nodes always deny the packet, wherein the firewall nodes implement a gateless design, wherein each of the packets is replicated to each of the firewall nodes, and wherein a packet that is accepted by one of the firewall nodes is forwarded to an internal network in a manner that bypasses the remaining firewall nodes.

40. The method of claim 39 wherein distributing the rules among a plurality of firewall nodes using the DAG includes distributing the rules such that intersecting accept rules are not present in more than one firewall node.

41. The method of claim 39 wherein distributing the rules among a plurality of firewall nodes using the DAG includes distributing the rules such that the edges to not span multiple firewall nodes.

42. The method of claim 39 wherein distributing the rules among a plurality of firewall nodes using the DAG includes replicating deny rules in each of the firewall nodes.

43. The method of claim 42 comprising eliminating a deny rule implemented by a first firewall node in response to determining that the deny rule for the first firewall node includes no inbound edges and outbound edges from the first deny rule terminate only in a superset deny rule.

44. A computer program product comprising computer executable instructions embodied in a non-transitory computer readable medium for performing steps comprising:
  (a) distributing packet filtering rules of a rule set among a plurality of different firewall nodes in a function-parallel manner so that at least some of the different firewall nodes implement different portions of the rule set;
  (b) replicating packets to each of the firewall nodes; and
  (c) applying the rules to filter the packets, wherein distributing the rules among a plurality of nodes includes distributing the rules among the nodes which implement a gateless design, where, for any given packet, only one of the nodes accepts the packet and all of the remaining nodes always deny the packet and wherein each of the packets is replicated to each of the firewall nodes, and wherein a packet that is accepted by one of the firewall nodes is forwarded to an internal network in a manner that bypasses the remaining firewall nodes.

45. A computer program product comprising computer executable instructions embodied in a non-transitory computer readable medium for performing steps comprising:
  (a) defining a rule set for a function-parallel firewall;
  (b) assigning rules in the rule set to nodes and branches in a trie data structure, wherein each node in the trie data structure corresponds to a data field and each branch represents a value for each data field to be compared to values in corresponding fields in received packets;
  (c) pruning the trie data structure in a manner that preserves ordering of the rules in the rule set; and
  (d) assigning rules to firewall nodes such that only one node is assigned a rule that accepts a given packet and all of the remaining firewall nodes of the firewall are assigned rules that always deny the packet, wherein the firewall nodes implement a gateless design, wherein each of the packets is replicated to each of the firewall nodes, and wherein a packet that is accepted by one of the firewall nodes is forwarded to an internal network in a manner that bypasses the remaining firewall nodes.

46. A computer program product comprising computer executable instructions embodied in a non-transitory computer readable medium for performing steps comprising:
  (a) assigning rules to nodes in a directed acyclical graph (DAG);
  (b) representing relationships between rules by edges in the DAG; and
  (c) distributing the rules among a plurality of firewall nodes using the DAG such that the relationships between the rules specified in the DAG are preserved, wherein distributing the rules among a plurality of firewall nodes includes distributing the rules among the nodes, which implement a gateless design, where, for any given packet, only one of the firewall nodes accepts the packet and all of the remaining firewall nodes always deny the packet, wherein each of the packets is replicated to each of the firewall nodes, and wherein a packet that is accepted by one of the firewall nodes is forwarded to an internal network in a manner that bypasses the remaining firewall nodes.

* * * * *